(12) United States Patent
Marks

(10) Patent No.: US 12,078,270 B1
(45) Date of Patent: *Sep. 3, 2024

(54) DUAL CAM LEVER HOSE CLAMP AND METHODS OF USE THEREOF

(71) Applicant: The United States of America, as represented by the Secretary of the Navy, Arlington, VA (US)

(72) Inventor: Galen L. Marks, Oxnard, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/098,468

(22) Filed: Jan. 18, 2023

Related U.S. Application Data

(63) Continuation-in-part of application No. 16/896,365, filed on Jun. 9, 2020, now Pat. No. 11,585,475.

(51) Int. Cl.
  *F16L 23/06* (2006.01)
(52) U.S. Cl.
  CPC .................................. *F16L 23/06* (2013.01)
(58) Field of Classification Search
  CPC ............ F16L 23/06; F16L 33/10; F16L 33/12
  See application file for complete search history.

(56) References Cited

U.S. PATENT DOCUMENTS

| | | | |
|---|---|---|---|
| 1,399,416 A * | 12/1921 | Turner, Sr. .............. | F16L 33/12 24/19 |
| 1,994,361 A | 3/1935 | Johnson | |
| 2,689,141 A | 9/1954 | Kiekhaefer | |
| 2,725,246 A * | 11/1955 | Weinhold ................ | F16L 33/12 285/252 |
| 2,775,806 A | 1/1957 | Love | |
| 3,600,770 A | 8/1971 | Halling | |
| 3,937,498 A * | 2/1976 | Weinhold ................ | F16L 33/12 285/124.2 |
| 3,967,837 A | 7/1976 | Westerlund | |
| 4,123,095 A | 10/1978 | Stehlin | |

(Continued)

OTHER PUBLICATIONS

Mineflex/Hose Solutions Inc., Mineflex High Pressure Dewatering Hose, brochure, Mineflex, Scottsdale, AZ, United States.

*Primary Examiner* — David Bochna
(74) *Attorney, Agent, or Firm* — Naval Facilities Engineering and Expeditionary Warfare Center; Jimmy M. Sauz

(57) ABSTRACT

A dual cam lever hose clamp may comprise: first and second cam lever clamps and upper and lower clamp halves. The cam lever clamps may move between a retaining position and release position. The upper and lower clamp halves may form a collar when opposing ends of the clamp halves fasten together via the cam lever clamps. The first cam lever clamp may comprise a first linkage pivotally coupled to a first end of the lower clamp half and a first cam lever pivotally coupled to the first linkage. The second cam lever clamp may comprise a second linkage pivotally coupled to a second end of the lower clamp half and a second cam lever pivotally coupled to the second linkage. The first and second cam lever clamps may comprise cam levers that cammingly engage cam locking surfaces on the upper clamp half to fasten and tighten the collar.

20 Claims, 10 Drawing Sheets

(56) References Cited

U.S. PATENT DOCUMENTS

| | | | | |
|---|---|---|---|---|
| 4,687,234 A | * | 8/1987 | Weinhold | F16L 33/12 |
| | | | | 285/244 |
| 4,705,305 A | | 11/1987 | Ghaly | |
| 4,812,285 A | | 3/1989 | Stapleton | |
| 5,074,600 A | * | 12/1991 | Weinhold | F16L 33/12 |
| | | | | 285/243 |
| 5,454,606 A | | 10/1995 | Voss et al. | |
| 6,470,538 B2 | | 10/2002 | Richter | |
| 6,672,631 B1 | | 1/2004 | Weinhold | |
| 9,927,052 B1 | | 3/2018 | Robillard | |
| 11,585,475 B1 | * | 2/2023 | Marks | F16L 33/10 |
| 2003/0116968 A1 | | 6/2003 | Dallai et al. | |
| 2009/0096210 A1 | | 4/2009 | Maunder | |
| 2019/0383431 A1 | * | 12/2019 | Magagna | F16L 33/06 |

\* cited by examiner

DUAL CAM LEVER HOSE CLAMP AND METHODS OF USE THEREOF

CROSS-REFERENCE TO RELATED APPLICATIONS

This application is a continuation-in-part patent application of the commonly owned, U.S. non-provisional patent application Ser. No. 16/896,365, titled "Dual Cam Lever Hose Clamp," filed on Jun. 9, 2020, which issued on Feb. 21, 2023 as U.S. Pat. No. 11,585,475, by inventor Galen L. Marks, the contents of which are hereby expressly incorporated herein by reference in its entirety and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to hose clamps and methods of use thereof.

BACKGROUND

In general, hoses having a large bore or diameter (e.g., 6" to 12") such as layflat or collapsible hoses are critical to the rapid repair and resiliency of military bases infrastructure. When assembling these large bore hoses, special tools are generally required. The hose generally must be payed out to a desired length, cut, and clamped at the desired hose end. Unfortunately, clamps used for these large bore hoses comprise four or more sections or segments and generally require one or more fasteners installed and tightened for each section or segment. Given that these hoses are rated as high pressure hoses, the clamp must be tightened to a specific torque. Thus, a substantial amount of time may be spent assembling the hose end. In this regard, there is a need for improvement in expediting the assembly of a layflat hose end in an efficient manner.

SUMMARY OF ILLUSTRATIVE EMBODIMENTS

To minimize the limitations in the related art and other limitations that will become apparent upon reading and understanding the present specification, the following discloses embodiments of a new and useful dual cam lever hose clamp.

One embodiment may be a dual cam lever hose clamp, comprising: first and second cam lever clamps, each configured to move between a retaining position and a release position; and upper and lower clamp halves adapted to form a collar when first ends of the upper and lower clamp halves fasten each other via the first cam lever clamp and when second ends of the upper and lower clamp halves fasten each other via the second cam lever clamp. The first cam lever clamp may comprise: a first linkage pivotally coupled to the first end of the lower clamp half and adapted to traverse through first grooves laterally located on the first ends of the upper and lower clamp halves; and a first cam lever pivotally coupled to the first linkage and adapted to fasten the first ends of the upper and lower clamp halves when a first cam follower cammingly engages a first cam surface of the upper clamp half; and wherein the second cam lever clamp may comprise: a second linkage pivotally coupled to the second end of the lower clamp half and adapted to traverse through second grooves laterally located on the second ends of the upper and lower clamp halves; and a second cam lever pivotally coupled to the second linkage and adapted to fasten the second ends of the upper and lower clamp halves when a second cam follower cammingly engages a second cam surface of the upper clamp half. The first cam surface may be located on the first end of the upper clamp half and may comprise a first detent for latching the first cam follower into the retaining position. The first cam surface may further comprise a second detent for transitioning the first cam follower into the release position. The second cam surface may be located on the second end of the upper clamp half and may comprise a first detent for latching the second cam follower into the retaining position. The second cam surface may further comprise a second detent for transitioning the second cam follower into the release position. The first and second linkages may each comprise upper and lower linkage portions adapted to fasten to each other via a screw thread fastener, such that, when the screw thread fastener is tightened, the first and second linkages may be adjustable in length.

Another embodiment may be a dual cam lever hose clamp, comprising: first and second cam lever clamps, each configured to move between a retaining position and a release position; and upper and lower clamp halves, each comprising two arm portions pivotally coupled to each other and adapted to form a collar when first ends of the upper and lower clamp halves fasten each other via the first cam lever clamp and when second ends of the upper and lower clamp halves fasten each other via the second cam lever clamp; wherein the first cam lever clamp may comprise: a first linkage pivotally coupled to the first end of the lower clamp half and adapted to traverse through first grooves laterally located on the first ends of the upper and lower clamp halves; and a first cam lever pivotally coupled to the first linkage and adapted to fasten the first ends of the upper and lower clamp halves when a first cam follower cammingly engages a first cam surface of the upper clamp half; and wherein the second cam lever clamp may comprise: a second linkage pivotally coupled to the second end of the lower clamp half and adapted to traverse through second grooves laterally located on the second ends of the upper and lower clamp halves; and a second cam lever pivotally coupled to the second linkage and adapted to fasten the second ends of the upper and lower clamp halves when a second cam follower cammingly engages a second cam surface of the upper clamp half. The first cam surface may be located on the first end of the upper clamp half and may comprise a first detent for latching the first cam follower into the retaining position. The first cam surface may further comprise a second detent for transitioning the first cam follower into the release position. The second cam surface may be located on the second end of the upper clamp half and may comprise a first detent for latching the second cam follower into the retaining position. The second cam surface may further comprise a second detent for transitioning the second cam follower into the release position. The first and second linkages may each comprise upper and lower linkage portions adapted to fasten to each other via a screw thread fastener, such that, when the screw thread fastener is tightened, the first and second linkages may be adjustable in length. The collar may have a diameter between approximately 5 inches to 13 inches.

Another embodiment may be a dual cam lever hose clamp, comprising: first and second cam lever clamps, each configured to move between a retaining position and a release position; and upper and lower clamp halves, each comprising two arm portions pivotally coupled to each other and adapted to form a collar when first ends of the upper and lower clamp halves fasten each other via the first cam lever clamp and when second ends of the first and second clamp halves fasten each other via the second cam lever clamp; wherein the first cam lever clamp may comprise: a first linkage pivotally coupled to the first end of the lower clamp half and adapted to traverse through first grooves laterally located on the first ends of the first and second clamp halves; and a first cam lever pivotally coupled to the first linkage and adapted to fasten the first ends of the upper and lower clamp halves when a first cam follower cammingly engages a first cam surface of the upper clamp half; wherein the second cam lever clamp may comprise: a second linkage pivotally coupled to the second end of the lower clamp half and adapted to traverse through second grooves laterally located on the second ends of the upper and lower clamp halves; and a second cam lever pivotally coupled to the second linkage and adapted to fasten the second ends of the upper and lower clamp halves when a second cam follower cammingly engages a second cam surface of the upper clamp half; wherein the first and second linkages may each comprise upper and lower linkage portions adapted to fasten to each other via a screw thread fastener, such that, when the screw thread fastener is tightened, the first and second linkages may be adjustable in length; and wherein, when the first and second cam levers transition into the retaining position, the first and second cam levers may fasten and tighten the collar. The first cam surface may be located on the first end of the upper clamp half and may comprise a first detent for latching the first cam follower into the retaining position. The first cam surface may further comprise a second detent for transitioning the first cam follower into the release position. The second cam surface may be located on the second end of the upper clamp half and may comprise a first detent for latching the second cam follower into the retaining position. The second cam surface may further comprise a second detent for transitioning the second cam follower into the release position. The collar may have a diameter between approximately 5 inches to 13 inches.

Another embodiment may be a method of clamping a hose using a dual cam lever hose clamp, the method comprising the steps: (1) providing a dual cam lever hose clamp, comprising: first and second cam lever clamps, each configured to move between a retaining position and a release position; and upper and lower clamp halves adapted to form a collar when first ends of the upper and lower clamp halves fasten each other via the first cam lever clamp and when second ends of the upper and lower clamp halves fasten each other via the second cam lever clamp; wherein the first cam lever clamp may comprise: a first linkage pivotally coupled to the first end of the lower clamp half and adapted to traverse through first grooves vertically and serially disposed on the first ends of the upper and lower clamp halves when the first cam lever clamp is in the retaining position, such that the first linkage may be received within the first grooves of the upper and lower clamp halves; and a first cam lever pivotally coupled to the first linkage and adapted to fasten the first ends of the upper and lower clamp halves when a first cam follower cammingly engages a first cam surface of the upper clamp half, the first cam lever having an elongate and substantially curved shape extending beyond a center of the upper clamp half; and wherein the second cam lever clamp may comprise: a second linkage pivotally coupled to the second end of the lower clamp half and adapted to traverse through second grooves vertically and serially disposed on the second ends of the upper and lower clamp halves when the second cam lever clamp is in the retaining position, such that the second linkage may be received within the second grooves of the upper and lower clamp halves; and a second cam lever pivotally coupled to the second linkage and adapted to fasten the second ends of the upper and lower clamp halves when a second cam follower cammingly engages a second cam surface of the upper clamp half, the second cam lever having an elongate and substantially curved shape extending beyond the center of the upper clamp half, such that the second cam lever may be configured to overlap and obstruct the first cam lever when the first and second cam lever clamps are in the retaining position; (2) positioning a hose end of a hose around a pipe end, such that an upper end portion and a lower end portion of the hose end substantially may overlap the pipe end; (3) positioning the upper clamp half on the upper end portion of the hose end, such that an inner surface of the upper clamp half may contact the upper end portion of the hose; (4) positioning the lower clamp half directly beneath the upper clamp half and the lower end portion of the hose, such that an inner surface of the lower clamp half may contact the lower end portion of the hose; (5) fastening the first ends of the upper and lower clamp halves by transitioning the first cam lever clamp from the release position into the retaining position at the first ends of the upper and lower clamp halves, the transitioning step of the first cam lever clamp comprising the sub-steps of: (a) contacting and aligning the first ends of the upper and lower clamp halves in a serial manner, such that the first grooves may be vertically and serially disposed to each other; (b) pivoting the first linkage into the first grooves, such that the first linkage may traverse through the first grooves; (c) cammingly engaging the first cam follower against the first cam surface; and (4) pivoting the first cam lever towards the upper clamp half; and (6) fastening the second ends of the upper and lower clamp halves by transitioning the second cam lever clamp from the release position into the retaining position at the second ends of the upper and lower clamp halves, the transitioning step of the second cam lever clamp, comprising the sub-steps of: (a) contacting and aligning the second ends of the upper and lower clamp halves in a serial manner, such that the second grooves may be vertically and serially disposed to each other; (b) pivoting the second linkage into the second grooves, such that the second linkage may traverse through the second grooves; (c) cammingly engaging the second cam follower against the second cam surface; and (d) pivoting the second cam lever towards the upper clamp half. The method may further comprising the step of: fastening the first cam lever and the second cam lever together by securing a fastening device around the second cam lever and a notch located on the first cam lever when both the first cam lever and the second cam lever are in the retaining position. The first cam surface may be located on the first end of the upper clamp half and may comprise a first detent and a second detent. When the first cam lever pivots towards the upper clamp half, the first cam follower may transition from the second detent to the first detent of the first cam surface. The second cam surface may be located on the second end of the upper clamp half and may comprise a first detent and a second detent. When the second cam lever pivots towards the upper clamp half, the second cam follower may transition from the second detent to the first detent of the second cam surface. The first and second linkages may each comprise upper and lower linkage portions adapted to fasten to each other via a screw thread fastener, such that, when the screw thread fastener is tightened, the first and second linkages may be adjustable in length.

Another embodiment may be a method of clamping a hose using a dual cam lever hose clamp, the method comprising the steps: (1) providing a dual cam lever hose clamp, comprising: first and second cam lever clamps, each configured to move between a retaining position and a release position; and upper and lower clamp halves, each comprising two arm portions pivotally coupled to each other via first and second pivots, respectively, and adapted to form a collar when first ends of the upper and lower clamp halves fasten each other via the first cam lever clamp and when second ends of the upper and lower clamp halves fasten each other via the second cam lever clamp; wherein the first cam lever clamp may comprise: a first linkage pivotally coupled to the first end of the lower clamp half and adapted to traverse through first grooves vertically and serially disposed on the first ends of the upper and lower clamp halves when the first cam lever clamp is in the retaining position, such that the first linkage may be received within the first grooves of the upper and lower clamp halves; and a first cam lever pivotally coupled to the first linkage and adapted to fasten the first ends of the upper and lower clamp halves when a first cam follower cammingly engages a first cam surface of the upper clamp half, the first cam lever having an elongate and substantially curved shape extending beyond the first pivot; and wherein the second cam lever clamp may comprise: a second linkage pivotally coupled to the second end of the lower clamp half and adapted to traverse through second grooves vertically and serially disposed on the second ends of the upper and lower clamp halves when the second cam lever clamp is in the retaining position, such that the second linkage may be received within the second grooves of the upper and lower clamp halves; and a second cam lever pivotally coupled to the second linkage and adapted to fasten the second ends of the upper and lower clamp halves when a second cam follower cammingly engages a second cam surface of the upper clamp half, the second cam lever having an elongate and substantially curved shape extending beyond the first pivot, such that the second cam lever may be configured to overlap and obstruct the first cam lever when the first and second cam lever clamps are in the retaining position; (2) positioning a hose end of a hose around a pipe end, such that an upper end portion and a lower end portion of the hose end may substantially overlap the pipe end; (3) positioning the upper clamp half on the upper end portion of the hose end, such that an inner surface of the upper clamp half may contact the upper end portion of the hose; (4) positioning the lower clamp half directly beneath the upper clamp half and the lower end portion of the hose, such that an inner surface of the lower clamp half may contact the lower end portion of the hose; (5) fastening the first ends of the upper and lower clamp halves by transitioning the first cam lever clamp from the release position into the retaining position at the first ends of the upper and lower clamp halves, the transitioning step of the first cam lever clamp comprising the sub-steps of: (a) contacting and aligning the first ends of the upper and lower clamp halves in a serial manner, such that the first grooves may be vertically and serially disposed to each other; (b) pivoting the first linkage into the first grooves, such that the first linkage may traverse through the first grooves; (c) cammingly engaging the first cam follower against the first cam surface; and (d) pivoting the first cam lever towards the upper clamp half; and (6) fastening the second ends of the upper and lower clamp halves by transitioning the second cam lever clamp from the release position into the retaining position at the second ends of the upper and lower clamp halves, the transitioning step of the second cam lever clamp, comprising the sub-steps of: (a) contacting and aligning the second ends of the upper and lower clamp halves in a serial manner, such that the second grooves may be vertically and serially disposed to each other; (b) pivoting the second linkage into the second grooves, such that the second linkage may traverse through the second grooves; (c) cammingly engaging the second cam follower against the second cam surface; and (d) pivoting the second cam lever towards the upper clamp half. The method may further comprise the step of: fastening the first cam lever and the second cam lever together by securing a fastening device around the second cam lever and a notch located on the first cam lever when both the first cam lever and the second cam lever are in the retaining position. The first cam surface may be located on the first end of the upper clamp half and may comprise a first detent and a second detent. When the first cam lever pivots towards the upper clamp half, the first cam follower may transition from the second detent to the first detent of the first cam surface. The second cam surface may be located on the second end of the upper clamp half and may comprise a first detent and a second detent. When the second cam lever pivots towards the upper clamp half, the second cam follower may transition from the second detent to the first detent of the second cam surface. The first and second linkages may each comprise upper and lower linkage portions adapted to fasten to each other via a screw thread fastener, such that, when the screw thread fastener is tightened, the first and second linkages may be adjustable in length.

Another embodiment may be a method of releasing a dual cam lever hose clamp from a hose, the method comprising the steps: (1) providing a dual cam lever hose clamp fastened around a hose, the dual cam lever hose clamp comprising: first and second cam lever clamps, each configured to move between a retaining position and a release position; and upper and lower clamp halves, each comprising two arm portions pivotally coupled to each other via first and second pivots, respectively, and adapted to form a collar when first ends of the upper and lower clamp halves fasten each other via the first cam lever clamp and when second ends of the upper and lower clamp halves fasten each other via the second cam lever clamp; wherein the first cam lever clamp may comprise: a first linkage pivotally coupled to the first end of the lower clamp half and adapted to traverse through first grooves vertically and serially disposed on the first ends of the upper and lower clamp halves when the first cam lever clamp is in the retaining position, such that the first linkage may be received within the first grooves of the upper and lower clamp halves; and a first cam lever pivotally coupled to the first linkage and adapted to fasten the first ends of the upper and lower clamp halves when a first cam follower cammingly engages a first cam surface of the upper clamp half, the first cam lever having an elongate and substantially curved shape extending beyond the first pivot; wherein the second cam lever clamp may comprise: a second linkage pivotally coupled to the second end of the lower clamp half and adapted to traverse through second grooves vertically and serially disposed on the second ends of the upper and lower clamp halves when the second cam lever clamp is in the retaining position, such that the second linkage may be received within the second grooves of the upper and lower clamp halves; and a second cam lever pivotally coupled to the second linkage and adapted to fasten the second ends of the upper and lower clamp halves when a second cam follower cammingly engages a second cam surface of the upper clamp half, the second cam lever having an elongate and substantially curved shape extending beyond the first pivot, such that the second cam lever may be configured to overlap and obstruct the first cam lever when the first and second cam lever clamps are in the retaining position; wherein the first and second linkages may each comprise upper and lower linkage portions adapted to fasten to each other via a screw thread fastener, such that, when the screw thread fastener is tightened, the first and second linkages may be adjustable in length; and wherein, when the first and second cam levers transition into the retaining position, the first and second cam levers may fasten and tighten the collar; (2) unfastening the second ends of the upper and lower clamp halves by transitioning the second cam lever clamp from the retaining position into the release position, the transitioning step of the second cam lever clamp, comprising the sub-steps of: (a) pivoting the second cam lever away from the upper clamp half; (b) moving the second cam follower away from the second cam surface; and (c) removing the second linkage from the second grooves; (3) unfastening the first ends of the upper and lower clamp halves by transitioning the first cam lever clamp from the retaining position into the release position, the transitioning step of the first cam lever clamp, comprising the sub-steps of: (a) pivoting the first cam lever away from the upper clamp half; (b) moving the first cam follower away from the first cam surface; and (c) removing the first linkage from the first grooves; (4) removing the lower clamp half away from the lower end portion of the hose end; and (5) removing the upper clamp half away from the upper end portion of the hose end. The method may further comprise the step of: removing a fastening device secured around the first cam lever and the second cam lever. The second cam surface may be located on the second end of the upper clamp half and may comprise a first detent and a second detent. When the second cam lever pivots away from the upper clamp half, the second cam follower may transition from the first detent to the second detent of the second cam surface. The first cam surface may be located on the first end of the upper clamp half and may comprise a first detent and a second detent. When the first cam lever pivots away from the upper clamp half, the first cam follower may transition from the first detent to the second detent of the first cam surface.

It is an object to provide a tool that expedites the assembly of a hose end with minimal tools. The device preferably helps in the assembly of contingency fuel systems during situations that require rapid repair and resiliency. Layflat hoses can therefore be quickly assembled to get aircraft back in the air or to get water flowing where needed.

It is an object to provide a device designed to quickly clamp layflat hoses with large bores such as Mineflex® hoses. These hoses generally comprise with 6, 8, 10, and 12 inch diameters and may vary in thicknesses. Thus, the dual cam lever hose clamp disclosed herein is preferably designed to install a clamp that is quickly adjustable without tools to accommodate the varying hose thicknesses. The dual cam lever hose clamp preferably comprises two cam lever clamps. The first cam lever clamp is preferably designed to hold a slack portion of the hose, whereas the second cam lever clamp is preferably used for tightening the hose connection. Preferably, each cam lever clamp has a different cam rate and both cam levers have detents or notches for catching a cam follower of each cam lever.

It is an object to provide a device that is compliant with ANSI 150 Pressures.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

DETAILED DESCRIPTION OF ILLUSTRATIVE EMBODIMENTS

Figure 1:
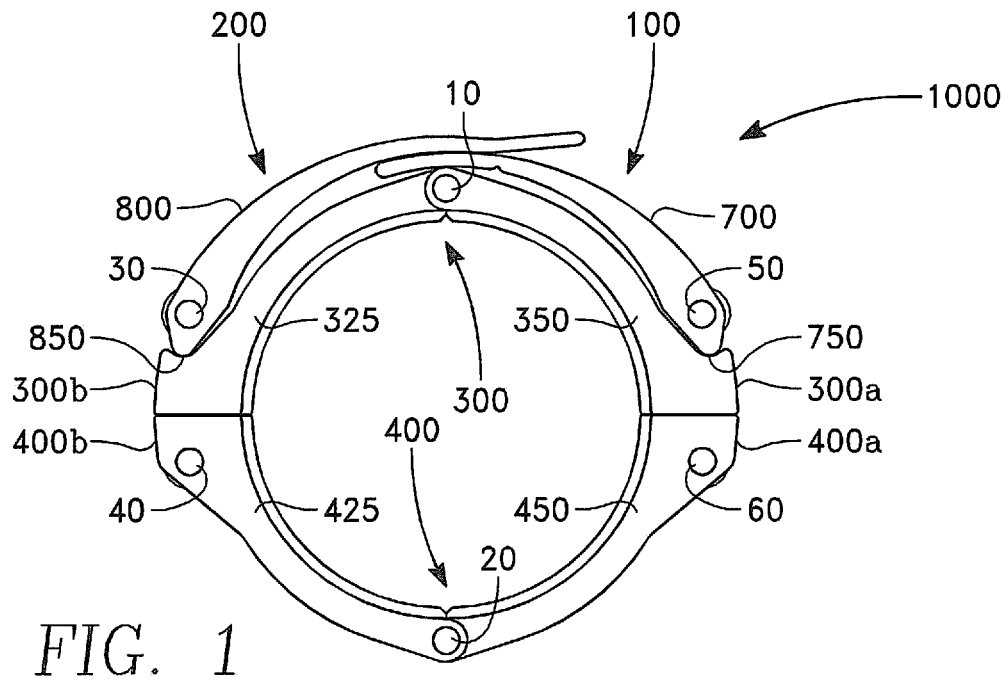
FIG. 1 is an illustration of a front elevation view of one embodiment of a dual cam lever hose clamp.

In the following detailed description, numerous specific details are set forth in order to provide a thorough understanding of various aspects of one or more embodiments of the in dual cam lever hose clamp and methods of use thereof. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . to provide a thorough understanding of the embodiments. One skilled in the relevant art will recognize, however, that the scope of protection can be practiced without one or more of the specific details, or with other methods, components, materials, etc. . . . In other instances, well-known structures, materials, or operations are generally not shown or described in detail to avoid obscuring aspects of the disclosure.

Definitions

In the following description, certain terminology is used to describe certain features of the embodiments of the dual cam lever hose clamp. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein, the term "near" refers to a region within close proximity of an intended point, position, or target. The term "near" may also refer to being at the intended point, position, or target. In various embodiments, near may refer to within four feet of an intended point.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

By way of illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

Although the terms first, second, third, etc. . . . may be used herein to describe various elements, components, regions, layers, and/or sections, these elements, components, regions, layers, and/or sections should not be limited by these terms. These terms may be only used to distinguished one element, component, region, layer, or section fro, another element, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the illustrative embodiments.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise.

The present disclosure relates generally to hose clamps and methods of use. In general, hoses having a large bore or diameter (e.g., 6" to 12") such as layflat or collapsible hoses are critical to the rapid repair and resiliency of military bases infrastructure. When assembling these large bore hoses, special tools are generally required. The hose generally must be payed out to a desired length, cut, and clamped at the desired hose end. Unfortunately, clamps used for these large bore hoses generally comprise several sections or segments that require one or more fasteners installed and tightened for each section or segment. Given that these hoses are rated as high pressure hoses, the clamp must be tightened to a specific torque. Thus, a substantial amount of time may be spent in the assembly of the hose end. In this regard, there is a need for improvement in expediting the assembly of a layflat hose end in an efficient manner.

Embodiments of the dual cam lever hose clamp disclosed herein solve this problem by immediately and efficiently clamping a hose end via two cam levers. The first cam lever may be used to secure a slack portion of the hose end, and the second cam lever may tighten the connection to a desired tightness. Each cam lever may have a different cam rate and both cam levers may have detents or notches for adjusting the cam follower ends of each cam lever between a retaining position and release position. In this manner, the user may apply the proper amount of force for each cam lever to securely tighten the hose end connection in a quick and efficient manner.

In the accompany drawings, like reference numbers indicate like elements. Reference characters 1000 depict multiple embodiments of the dual cam lever hose clamp.

FIG. 1 is an illustration of a front elevation view of one embodiment of a dual cam lever hose clamp 1000. The dual cam lever hose clamp 1000 may comprise first and second cam lever clamps 100, 200 configured to move or transition between a retaining position and a release position in order to retain and tighten a hose end of a large bore hose. Specifically, when utilizing the dual cam lever hose clamp 1000 at a hose end, adjusting a first cam lever clamp 100 from the release position to the retaining position may secure a slack portion of the hose end by preventing movement of the first ends 300a, 400a of the upper clamp half 300 and lower clamp half 400. Additionally, adjusting a second cam lever clamp 200 from the release position to the retaining position may tighten the hose end connection to a desired tightness by preventing movement of the second ends 300b, 400b of the upper clamp half 300 and lower clamp half 400. Transitioning the first cam lever clamp 100 and second cam lever clamp 200 into the release position may enable movement of the first ends 300a, 400a and second ends 300b, 400b of the upper clamp half 300 and lower clamp half 400. As such, the dual cam lever hose clamp 1000 may clamp a hose end expeditiously by simply actuating two cam levers.

As shown in FIG. 1, one embodiment of the dual cam lever hose clamp 1000 may comprise cam lever clamps 100, 200, upper clamp half 300, lower clamp half 400, and pivots 10, 20, 30, 40, 50, 60. First and second cam lever clamps 100, 200 may each comprise a linkage 150 (shown in FIG. 2), 250 (shown in FIG. 3) and a cam lever 700, 800. Upper clamp half 300 and lower clamp half 400 may further comprise arm portions 325, 350, 425, 450. When upper clamp half 300 and lower clamp half 400 are clamped and tightened together, upper clamp half 300 and lower clamp half 400 may form a collar for clamping and tightening a hose end.

Arm portions 325, 350 of the upper clamp half 300 may be pivotally coupled to each other at pivot 10. Similarly, arm portions 425, 450 of the lower clamp half 400 may be pivotally coupled to each other at pivot 20. Thus, upper clamp half 300 and lower clamp half 400 may form the collar when first ends 300a, 400a and second ends 300b, 400b of the upper clamp half 300 and lower clamp half 400 couple or fasten each other. Specifically, first ends 300a, 400a of the upper clamp half 300 and lower clamp half 400 may fasten each other via the first cam lever clamp 100. Additionally, second ends 300b, 400b of the upper clamp half 300 and lower clamp half 400 may fasten each other via the second cam lever clamp 200.

In particular, the first cam lever clamp 100 may comprise a first linkage 150 and a first cam lever 700. The first linkage 150 may mechanically interconnect the first cam lever 700 to the lower clamp half 400 and may be pivotally coupled to the first end 400a of the lower clamp half 400 at pivot 60 (i.e., arm portion 450). Similarly, the second cam lever clamp 200 may comprise a second linkage 250 and a second cam lever 800. The second linkage 250 may mechanically interconnect the second cam lever 800 to the lower clamp half 400 and may be pivotally coupled to the second end 400b of the lower clamp half 400 at pivot 40 (i.e., arm portion 425). Preferably, the first cam lever 700 and second cam lever 800 have different cam rates to apply varying tightness.

First grooves 301, 401 (shown in FIG. 2) and second grooves 302, 402 (shown in FIG. 3) may be laterally positioned at the first ends 300a, 400a and second ends 300b, 400b of the upper clamp half 300 and lower clamp half 400, respectively, and may be configured to receive the first linkage 150 and second linkage 250. Thus, when the first and second cam lever clamps 100, 200 fasten and tighten the upper clamp half 300 and lower clamp half 400, the first linkage 150 may traverse through the first grooves 301, 401 located at the first ends 300a, 400a, and the second linkage 250 may traverse through the second grooves 302, 402 located at the second ends 300b, 400b. Upon fastening, a first cam follower 750 (i.e., a lower portion of the first cam lever 700 pivotally coupled to the linkage 150) may cammingly engage a first cam surface 350c (shown in FIGS. 8, 9, 10) located on the first end 300a of the upper clamp half 300, whereas a second cam follower 850 (i.e., a lower portion of the second cam lever 800 pivotally coupled to the linkage 250) may cammingly engage a second cam surface 325c (shown in FIGS. 8, 9, 10) located on the second end 300b of the upper clamp half 300. In this manner, pivotal movement of the first and second cam lever clamps 100, 200 between the retaining position and release position about pivots 30, 50 may be translated on the first cam surface 350c and second cam surface 325c. As such, as the first cam lever 700 and second cam lever 800 transition into the retaining position, as shown in FIGS. 1-3 and 6-7, the first cam lever 700 and second cam lever 800 may fasten and tighten the collar.

First cam follower 750 and second cam follower 850 may be sized and shaped to be captured within the first detent 350a, 325a (shown in FIGS. 6, 7) formed on the first cam surface 350c and second cam surface 325c when the first cam lever 700 and second cam lever 800 transition into the retaining position. Additionally, the first cam surface 350c and second cam surface 325c may provide, at least in part, a smooth transition for first cam follower 750 and second cam follower 850 to move to first detent 350a, 325a from second detent 350b, 325b (shown in FIGS. 6, 7).

Figure 9:
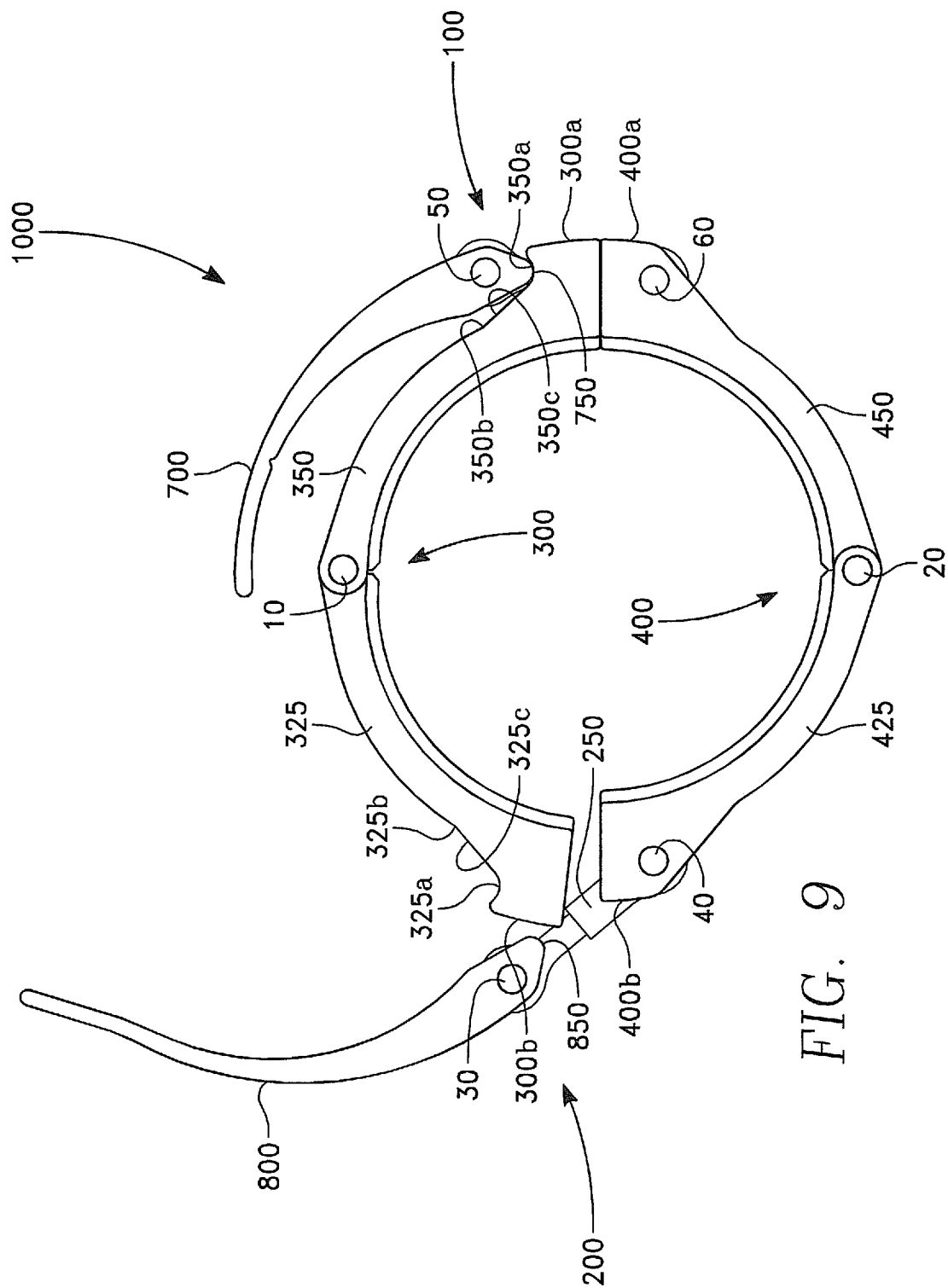
FIG. 9 is an illustration of a front elevation view of one embodiment of the dual cam lever hose clamp and shows the first cam lever clamp transitioning from the retaining position to the release position and the second cam lever clamp in the release position.
Figure 10:
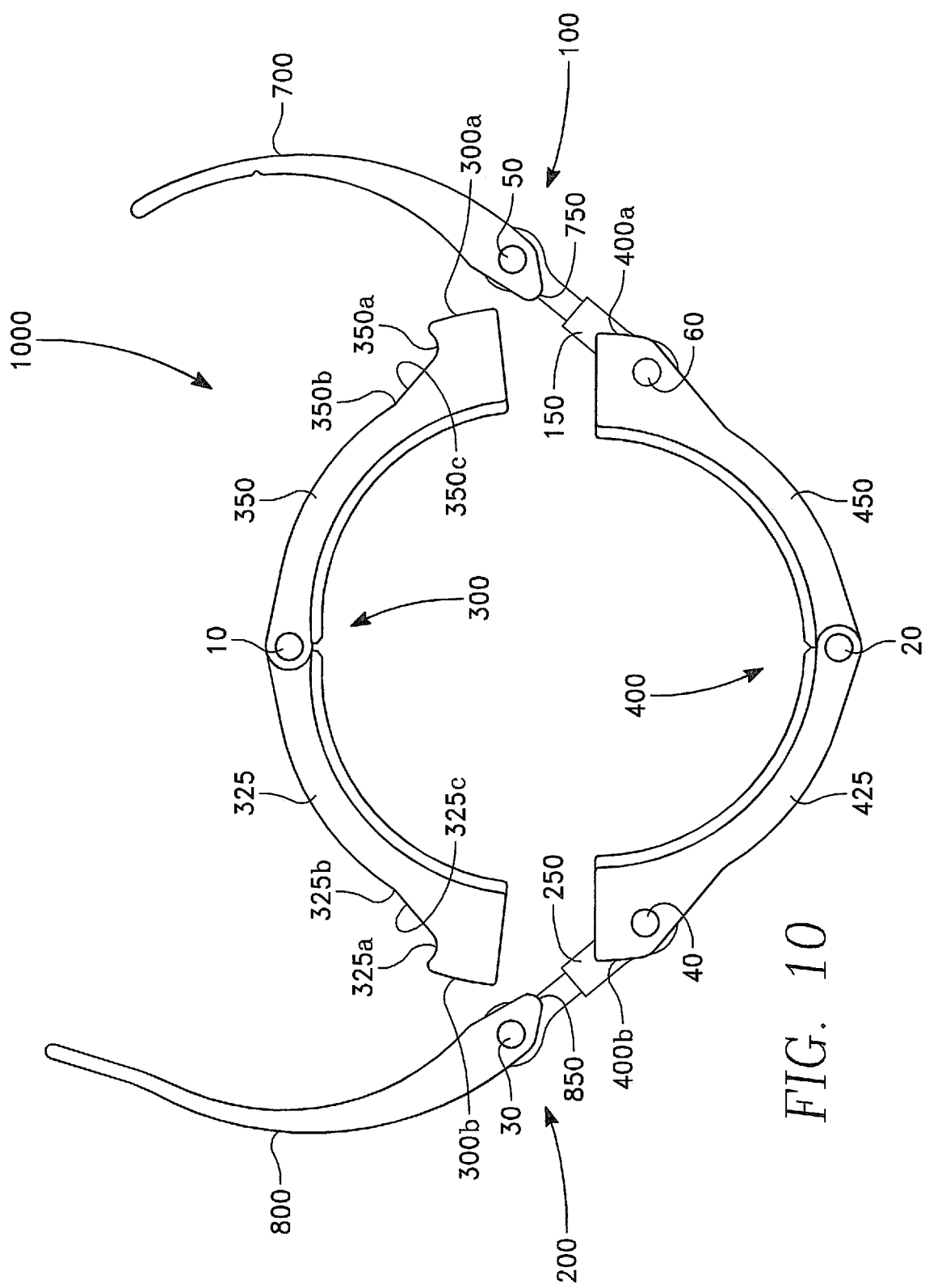
FIG. 10 is an illustration of a front elevation view of one embodiment of the dual cam lever hose clamp and shows the upper clamp half separated from the lower clamp half.

When the first cam follower 750 cammingly engages the first cam surface 350c, the first cam lever 700 may be pivotable at pivot 50 between the retaining position (shown in FIGS. 1-3, 6-7) and release position (shown in FIG. 10). Similarly, when the second cam follower 850 cammingly engages the second cam surface 325c, the second cam lever 800 may be pivotable at pivot 30 between the retaining position (as shown in FIGS. 1-3, 6-7) and release position (shown in FIGS. 9, 10).

Regarding the first cam lever 700 and second cam lever 800, the first cam lever 700 and second cam lever 800 can define any number of shapes and contours. In one embodiment, the first cam lever 700 and second cam lever 800 may be cantilever shaped pivotally coupled to the first linkage 150 and second linkage 250, respectively. In another embodiment, the first cam lever 700 and second cam lever 800 may be defined as an elongated member that defines at least a portion of the upper clamp 300. In this manner, the user can benefit from mechanical advantage to actuate between the retaining position and release position.

Figure 2:
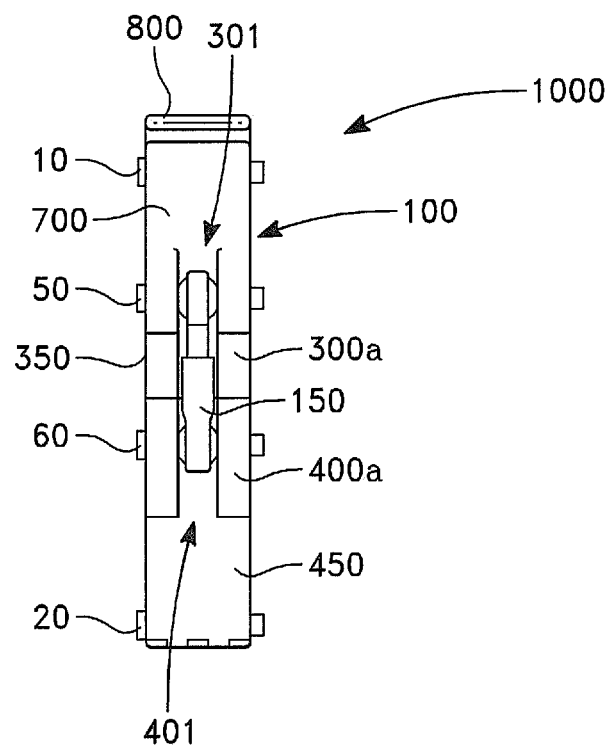
FIG. 2 is an illustration of a right side elevation view thereof.
Figure 3:
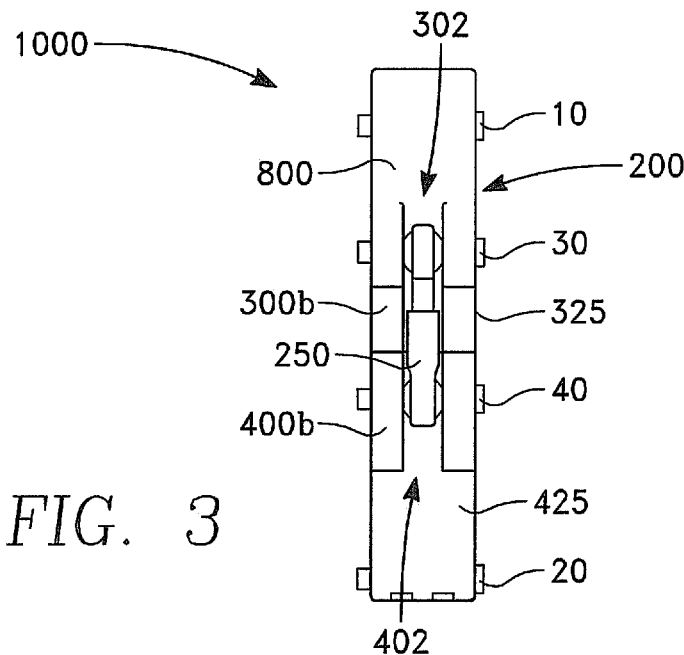
FIG. 3 is an illustration of a left side elevation view thereof.

FIG. 2 is an illustration of a left side elevation view of one embodiment of the dual cam lever hose clamp 1000. As shown in FIG. 2, one embodiment of the dual cam lever hose clamp 1000 may comprise a first cam lever clamp 100, pivots 10, 20, 50, 60, and arm portions 350, 450. FIG. 2 also shows that the first cam lever clamp 100 may comprise a linkage 150 and a first cam lever 700. Importantly, FIG. 3 depicts the first grooves 301, 401 located at the first ends 300a, 400a of the upper clamp half 300 and lower clamp half 400, respectively. Finally, FIG. 3 shows how linkage 150 may traverse through the first grooves 301, 401 and provide a mechanical connection between the second cam lever 700 at pivot 50 and the first end 400a of the lower clamp half 400 at pivot 60 (i.e., arm portion 450).

FIG. 3 is an illustration of a right side elevation view of one embodiment of the dual cam lever hose clamp 1000. As shown in FIG. 3, one embodiment of the dual cam lever hose clamp 1000 may comprise a second cam lever clamp 200, pivots 10, 20, 30, 40, and arm portions 325, 425. FIG. 3 also shows that the second cam lever clamp 200 may comprise a linkage 250 and a second cam lever 800. Importantly, FIG. 3 depicts the second grooves 302, 402 located at the second ends 300b, 400b of the upper clamp half 300 and lower clamp half 400, respectively. FIG. 3 also shows how linkage 250 may traverse through the second grooves 302, 402 and provide a mechanical connection between the second cam lever 800 at pivot 30 and the second end 400b of the lower clamp half 400 at pivot 40 (i.e., arm portion 425).

Figure 4:
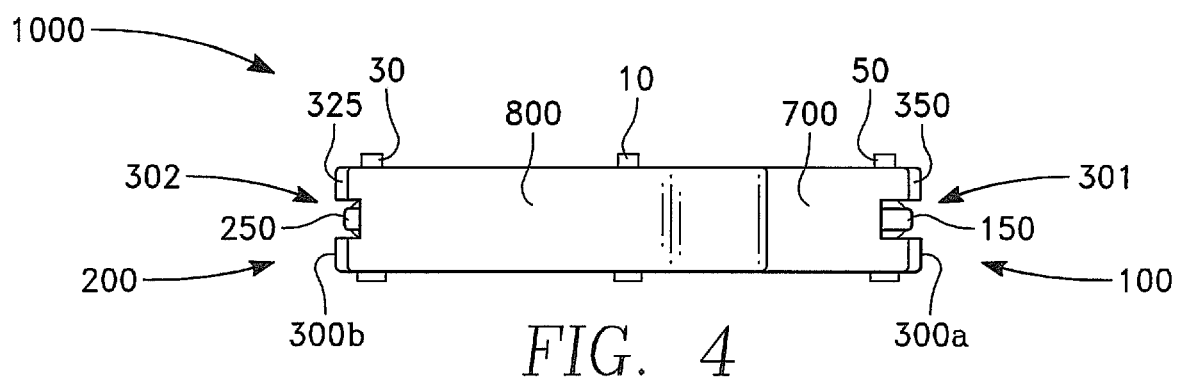
FIG. 4 is an illustration of a top plan view thereof

FIG. 4 is an illustration of a top plan view of one embodiment of the dual cam lever hose clamp. As shown in FIG. 4, one embodiment of the dual cam lever hose clamp 1000 may comprise first and second cam lever clamps 100, 200 having linkages 150, 250, pivots 10, 30, 50, and arm portions 325, 350 of upper clamp half 300. FIG. 4 also shows how linkages 150, 250 may be disposed within the first groove 301 and second groove 302, respectively, such that the linkages 150, 250 are flushed when the first and second cam lever clamps 100, 200 are in the retaining position.

Figure 5:
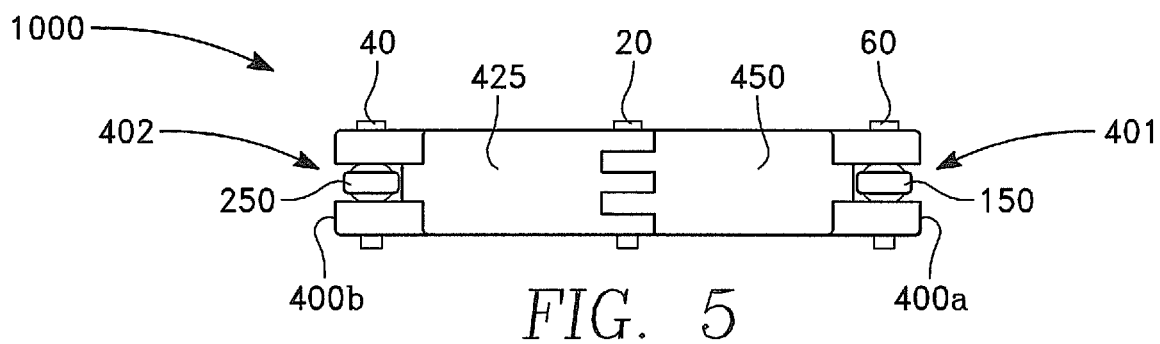
FIG. 5 is an illustration of a bottom plan view thereof.

FIG. 5 is an illustration of a bottom plan view of one embodiment of the dual cam lever hose clamp 1000. As shown in FIG. 5, one embodiment of the dual cam lever hose clamp 1000 may comprise linkages 150, 250, pivots 20, 40, 60, and arm portions 425, 450 of the lower clamp half 400. Like FIG. 4, FIG. 5 also shows how linkages 150, 250 may be disposed within the first groove 401 and second groove, 402, respectively, such that the linkages 150, 250 are flushed when the first and second cam lever clamps 100, 200 are in the retaining position. FIG. 5 also shows how arm portions 425, 450 may be pivotally coupled to each other at pivot 20. Although FIG. 5 does not depict how arm portions 325, 350 of the upper clamp half 300 are pivotally coupled at pivot 10, these arm portions 325, 350 may be pivotally coupled to each other in a similar manner.

Figure 6:
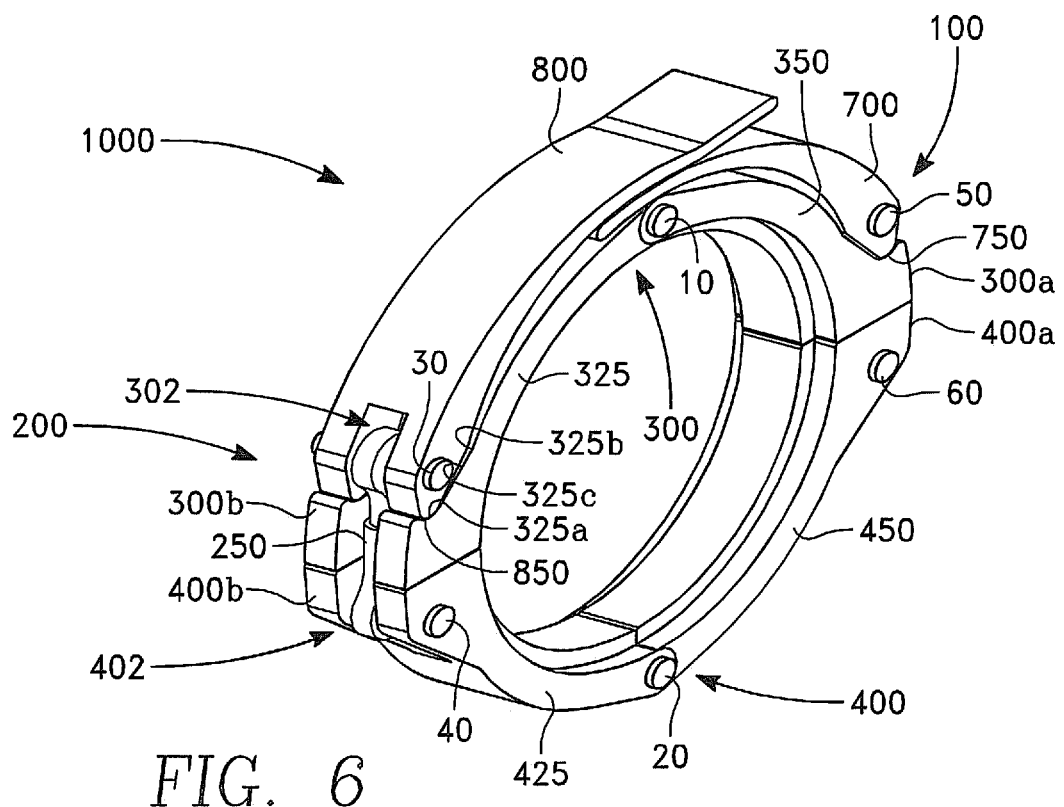
FIG. 6 is an illustration of a left perspective view thereof.

FIG. 6 is an illustration of a left perspective view of one embodiment of the dual cam lever hose clamp 1000. As shown in FIG. 6, one embodiment of the dual cam lever hose clamp 1000 may comprise first and second cam lever clamps 100, 200, upper clamp half 300, lower clamp half 400, and pivots 10, 20, 30, 40, 50, 60. FIG. 6 shows the first cam lever clamp 100, comprising a first cam lever 700, and the second cam lever clamp 200, comprising a linkage 250 and second cam lever 800. Upper clamp half 300 and lower clamp half 400 may further comprise arm portions 325, 350, 425, 450.

Importantly, FIG. 6 shows how the second cam lever clamp 200 fastens the second ends 300b, 400b of the upper clamp half 300 and lower clamp half 400. Here, a second cam follower 850 may cammingly engage a second cam surface 325c located on the second end 300b of the upper clamp half 300. The second cam surface 325c may also comprise first and second detents 325a, 325b, which are preferably notches or catches used to lock or release the movement of the second cam lever 800 between a retaining position and release position. Specifically, the first detent 325a may be positioned near the lower end of the second cam surface 325c to lock movement of the second cam follower 850 into the retaining position (shown in FIGS. 1, 6, 7). Second detent 325b, on the other hand, may be located near the upper end of the second cam surface 325c to release movement of the second cam follower 850 and second cam lever 800 (i.e., release position, shown in FIGS. 9, 10).

Figure 7:
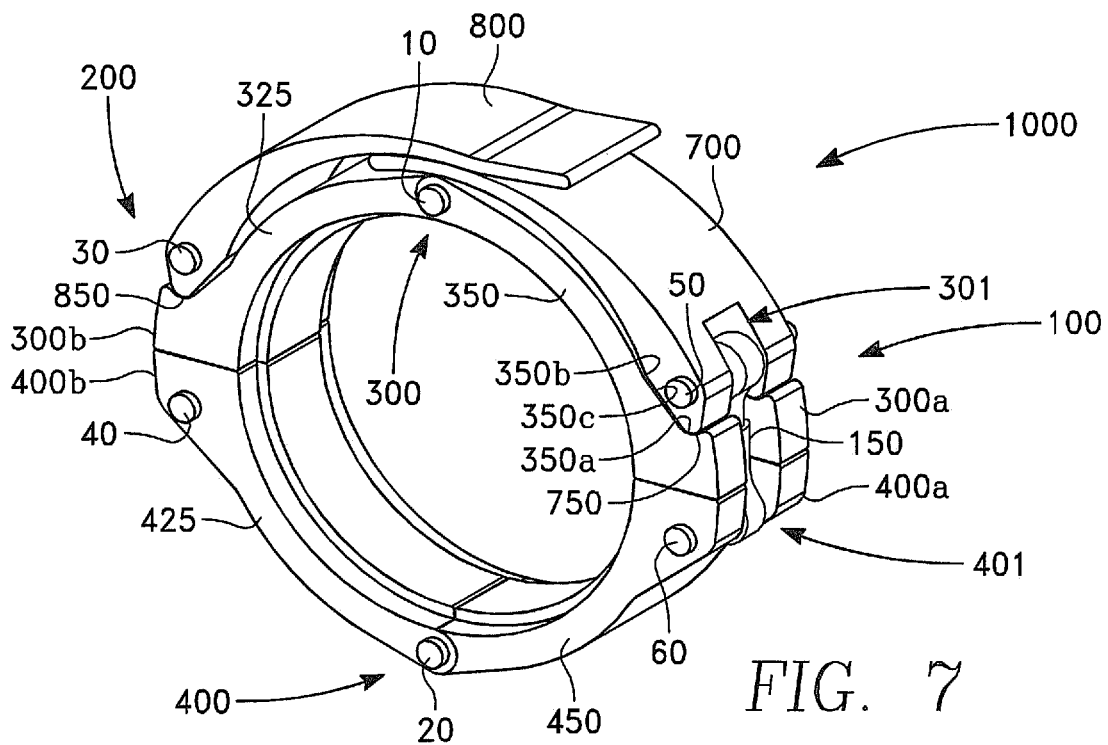
FIG. 7 is an illustration of a right perspective view thereof.

FIG. 7 is an illustration of a right perspective view of one embodiment of the dual cam lever hose clamp 1000. As shown in FIG. 7, one embodiment of the dual cam lever hose clamp 1000 may comprise first and second cam lever clamps 100, 200, upper clamp half 300, lower clamp half 400, and pivots 10, 20, 30, 40, 50, 60. FIG. 7 also shows the first cam lever clamp 100, comprising a linkage 150 and first cam lever 700, and the second cam lever clamp 200, comprising a second cam lever 800. Upper clamp half 300 and lower clamp half 400 may further comprise arm portions 325, 350, 425, 450.

Importantly, FIG. 7 shows how the first cam lever clamp 100 fastens the first ends 300a, 400a of the upper clamp half 300 and lower clamp half 400. Here, a first cam follower 750 may cammingly engage a first cam surface 350c located on the first end 300a of the upper clamp half 300. The first cam surface 350c may also comprise first and second detents 350a, 350b, which are preferably notches or catches used to lock or release movement of the first cam lever 700 between a retaining position and release position. Specifically, the first detent 350a may be positioned near the lower end of the first cam surface 350c to lock movement of the first cam follower 750 into the retaining position (shown in FIGS. 1, 6, 7, 9). Second detent 350b, on the other hand, may be located near the upper end of the first cam surface 350c to release movement of the first cam follower 750 and first cam lever 700 (i.e., release position, shown in FIG. 10).

It should be understood that the first cam follower 750 and second cam follower 850 can comprise any number of shapes; however, the first cam follower 750 and second cam follower 850 are preferably configured to engage first detents 325a, 350a and second detents 325b, 350a, formed on the upper clamp half 300 to retain the hose end.

First cam follower 750 and second cam follower 850 may be sized and shaped to be captured within the first detent 350a, 325a (shown in FIGS. 6, 7) formed the first cam surface 350c and second cam surface 325c when the first cam lever 700 and second cam lever 800 transition into the retaining position. Thus, during actuation of the cam lever clamps 100, 200 between the retaining position and release position, first cam follower 750 and second cam follower 850 may ride along the first cam surface 350c and second cam surface 325c.

Figure 8:
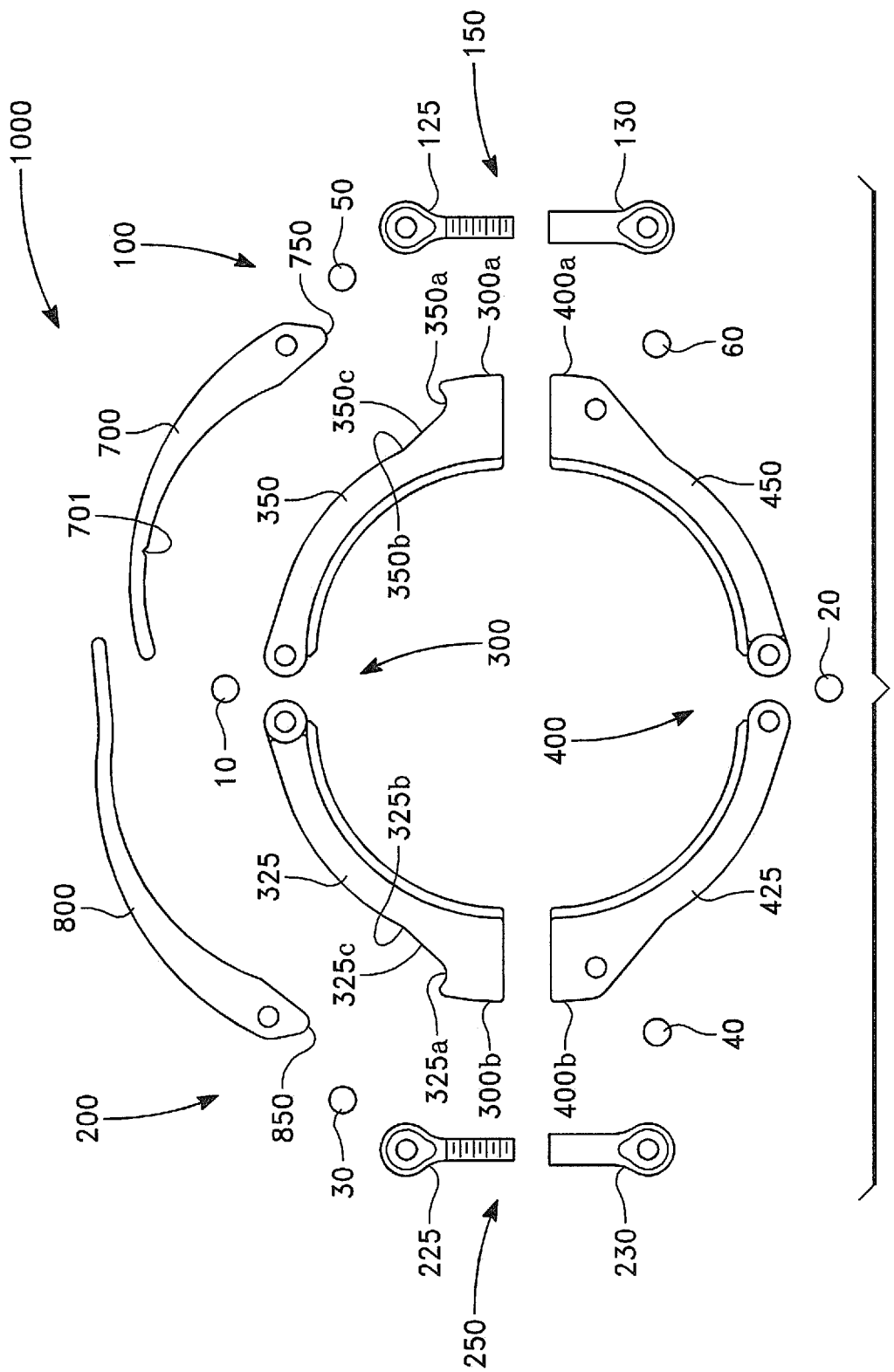
FIG. 8 is an illustration of an exploded view thereof.

FIG. 8 is an illustration of an exploded view of one embodiment of the dual cam lever hose clamp 1000. As shown in FIG. 8, one embodiment of the dual cam lever hose clamp 1000 may comprise first and second cam lever clamps 100, 200, upper clamp half 300, lower clamp half 400, and pivots 10, 20, 30, 40, 50, 60. The first and second cam lever clamps 100, 200 may comprise linkages 150, 250 and cam levers 700, 800. Upper clamp half 300 and lower clamp half 400 may further comprise arm portions 325, 350, 425, 450.

Importantly, FIG. 8 shows that the linkages 150, 250, which are adapted to pivotally couple the lower clamp portion 400 and cam levers 700, 800, may each comprise an upper linkage portion 125, 225 and lower linkage portion 130, 230. The upper linkage portion 125, 225 and lower linkage portion 130, 230 are preferably adapted to matingly engage with each other via a screw thread fastener, which may allow the length of the linkages 150, 250 to be adjusted via tightening of the screw thread fastener. In another embodiment, the linkages 150, 250 can be biased to a predetermined position via a biasing member (e.g., spring) to have the cam followers 750, 850 engage the first detent 350a, 325a or second detent 350c, 325c along the first cam surface 350c or second cam surface 325c. In this manner, the linkages 150, 250 may extend in length when pulled in order for the cam followers 750, 850 to cammingly engage with the upper clamp half 300.

Finally, FIG. 8 shows that the first cam lever 700 may comprise a notch 701 for secure placement of a fastening device (e.g., cable tie or zip tie). When the cam lever clamps 100, 200 are both in the retaining position, a fastening device may be used to fasten the first cam lever 700 and second cam lever 800 together in order to restrict movement of the first and second cam lever clamps 100, 200. In this manner, the fastening device may prevent the first and second cam lever clamps 100, 200 from transitioning between a retaining position and release position.

FIG. 9 is an illustration of a front elevation view of one embodiment of the dual cam lever hose clamp 1000 and shows the first cam lever clamp 100 transitioning from the retaining position to the release position and the second cam lever clamp 200 in the release position. As shown in FIG. 9, one embodiment of the dual cam lever hose clamp 1000 may comprise first and second cam lever clamps 100, 200, upper clamp half 300, lower clamp half 400, and pivots 10, 20, 30, 40, 50, 60. The first and second cam lever clamps 100, 200 may comprise linkages 150, 250 and cam levers 700, 800. Upper clamp half 300 and lower clamp half 400 may further comprise arm portions 325, 350, 425, 450.

Importantly, FIG. 9 shows that, in order to remove the upper clamp half 300 from the lower clamp half 400, both cam lever clamps 100, 200 should shift from the retaining position to the release position. This may be achieved by first moving the second cam lever clamp 200 from the retaining position to the release position, as shown in FIG. 9. Once the second cam lever clamp 200 is in the release position, the second ends 300b, 400b of the upper clamp half 300 and lower clamp half 400 may decouple or separate from each other. Given that the second cam lever 800 is no longer obstructing the first cam lever 700, the first cam lever clamp 100 may then shift from the retaining position to the release position for removal of the upper clamp half 300. Otherwise, the first cam lever clamp 100 may continue to fasten the first ends 300a, 400a of the upper clamp half 300 and lower clamp half 400. As mentioned above, adjusting a single cam lever into the retaining position may secure a slack portion of the hose end.

FIG. 10 is an illustration of a front elevation view of one embodiment of the dual cam lever hose clamp 1000 and shows the upper clamp half 300 separated from the lower clamp half 400. As shown in FIG. 10, one embodiment of the dual cam lever hose clamp 1000 may comprise first and second cam lever clamps 100, 200, upper clamp half 300, lower clamp half 400, and pivots 10, 20, 30, 40, 50, 60, wherein the first and second cam lever clamp 100, 200 may each comprise linkages 150, 250 and a first or second cam lever 700, 800. Upper clamp half 300 and lower clamp half 400 may further comprise arm portions 325, 350, 425, 450.

In order to remove the upper hose clamp half 300 from the lower clamp half 400, the first and second cam lever clamps 100, 200 should transition into the release position, as shown in FIG. 10. In doing so, the first cam follower 750 and second cam follower 850 should transition from the first detent 350a, 325a to the second detent 350b, 325b, thereby releasing the first and second cam lever clamps 100, 200 from the first cam surface 350c and second cam surface 325c. As a result, the first ends 300a, 400a and second ends 300b, 400b of the upper clamp half 300 and lower clamp half 400 may decouple from each other, and the upper clamp half 300 may be released from the lower clamp half 400.

In operation, a user may first pay out and cut a hose to a desired length. After doing so, a user can clamp the hose end to another pipe-like structure by utilizing the dual cam lever hose clamp 1000. First, the user may position the upper clamp half 300 at the desired location at the hose end. Once the upper clamp half 300 is positioned at the desired location, the lower clamp half 400 is preferably positioned beneath the upper clamp half 300 with the hose disposed therebetween. Upon positioning the upper clamp half 300 and lower clamp half 400 at the desired location, the user may install the first cam lever clamp 100 at the first ends 300a, 400a of the upper clamp half 300 and lower clamp half 400 into its retaining position. This may be accomplished by pulling the first cam follower 750 over the first end 300a of the upper clamp half 300 and clamping the first cam lever 700 over the upper clamp half 300, such that the first cam follower 750 can engage the first cam surface 350c and engage the first detent 350a. Similarly, the user may then install the second cam lever clamp 200 at the second ends 300b, 400b of the upper clamp half 300 and lower clamp half 400 into its retaining position. This may be accomplished by pulling the second cam follower 850 over the second end 300b of the upper clamp half 300 and clamping the second cam lever 800 over the first cam lever 700, such that the second cam follower 850 can engage the second cam surface 325c and engage the first detent 325a. Upon transitioning the second cam lever clamp 200 to the retaining position, the dual cam lever hose clamp 1000 is preferably clamped and locked at the hosed end to a desired tightness. Optionally, a fastening device such as a zip tie can be used at notch 701 to restrict movement of the first and second cam levers 700, 800. Embodiments of this method are shown and discussed in more detail below in FIGS. 11 to 11B.

Likewise, the user can remove the dual cam lever hose clamp 1000 from the hose end quickly. After removing the fastening device at notch 701, the user can simply actuate the first cam lever clamp 100 and second cam lever clamp 200 into their release positions. Specifically, the user can grasp the second cam lever 800 and urge the second cam lever 800 from the retaining position to the release position, thereby releasing cam follower 850 from the first detent 325a to the second detent 325b of the second cam surface 325c. In this manner, the second cam lever clamp 200 can be pulled away from the second end 300b of the upper clamp half 300, thereby releasing the second end 300b of the upper clamp half 300 from the second end 400b of the lower clamp half 400. The second linkage 250 is then preferably pivoted about pivot 40 and away from the second end 300b of the upper clamp half 300. Similarly, after release of the second cam lever clamp 200, the user can grasp the first cam lever 700 and urge the first cam lever 700 from the retaining position to the release position, thereby releasing the first cam follower 750 from the first detent 350a to the second detent 350b of the first cam surface 350c. In this manner, the first cam lever clamp 100 can be pulled from the first end 300a of the upper clamp half 300, thereby releasing the first end 300a of the upper clamp half 300 from the first end 400a of the lower clamp half 400. The first linkage 150 is then preferably pivoted about pivot 60 and away from the first end 300a of the upper clamp half 300, thereby permitting the first clamp half 300 to be removed from the lower clamp half 400. Embodiments of this method are shown and discussed in more detail below in FIGS. 12 to 12B.

According to the principles of the present teachings, the dual cam lever hose clamp 1000 may be employed to permit safe and quick clamping and retention of a hose end for a large bore hose (e.g., layflat hose). This may permit the first cam lever 100 and/or second cam lever 200 to be safely locked in the retaining position and/or release position and provide a suitable robust locking mechanism that can retain clamping of the hose end.

Figure 11:
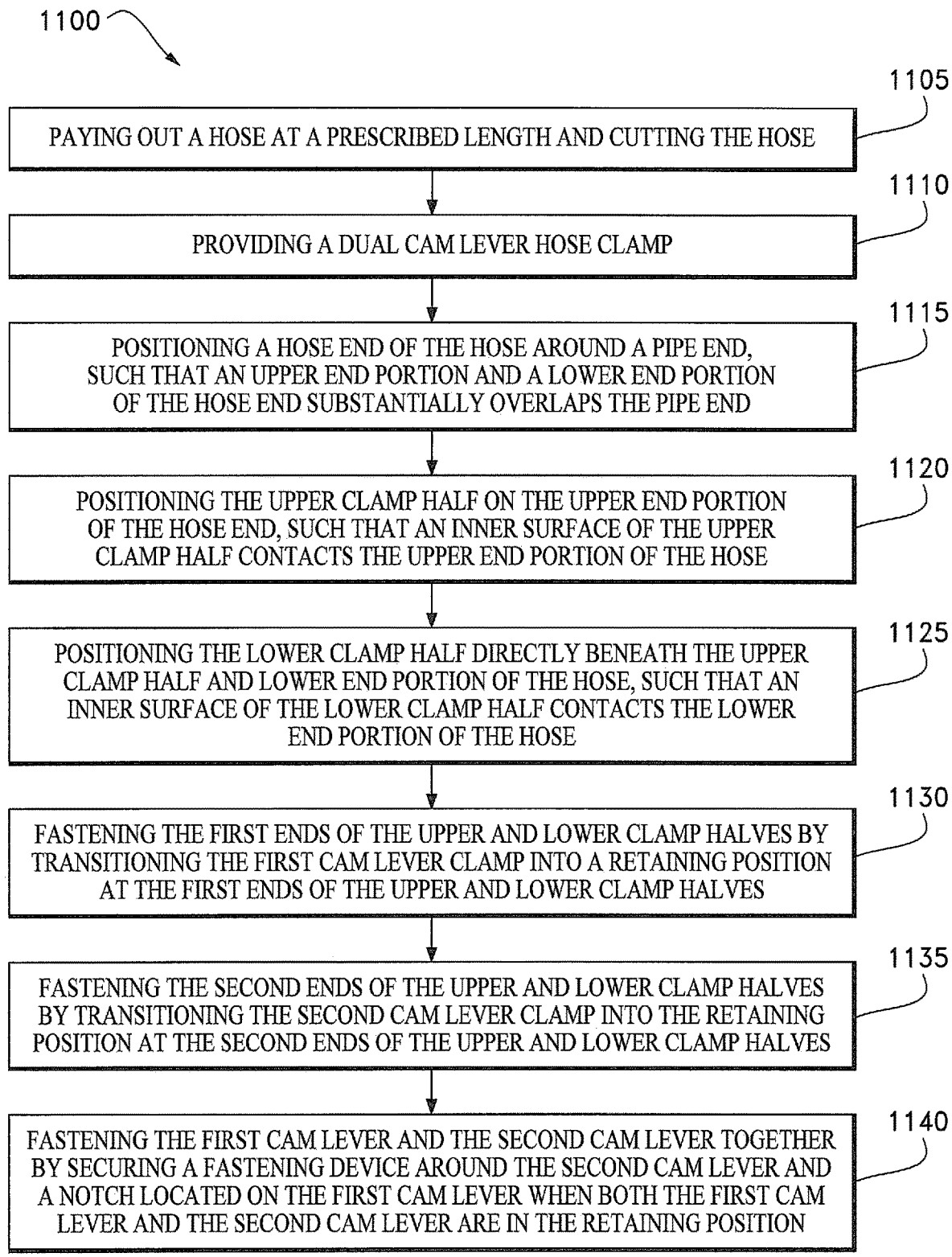
FIG. 11 is a flowchart of one embodiment of a method for clamping a hose using the dual cam lever hose clamp.

FIG. 11 is a flowchart of one embodiment of a method 1100 for clamping a hose using the dual cam lever hose clamp 1000. As shown in FIG. 11, one embodiment of the method 1100 may comprise steps: 1105, 1110, 1115, 1120, 1125, 1130, 1135, and 1140. FIG. 11 shows that the first step 1105 of the method 1100 may be paying out a hose at a prescribed length and cutting the hose. This may allow the user to adjust the hose's length and tailor the hose to a desired application. After doing so, the user may proceed to clamp the hose end to a pipe or pipe-like structure by performing the steps 1110 and 1115. In particular, the user may provide a dual cam lever hose clamp (step 1110), and then begin positioning a hose end around a pipe end, such that an upper end portion and a lower end portion of the hose end substantially overlaps the pipe end (step 1115). Once the hose end substantially overlaps the pipe end, the user may position the upper clamp half at the desired location at the hose end. The user, for example, may position the upper clamp half on the upper end portion of the hose end, such that an inner surface of the upper clamp half contacts the upper end portion of the hose (step 1120). Once the upper clamp half is positioned at the desired location, the lower clamp half is preferably positioned directly beneath the upper clamp half with the hose disposed therebetween. Thus, the user may perform step 1125, which is positioning the lower clamp half directly beneath the upper clamp half and the lower end portion of the hose, such that an inner surface of the lower clamp half contacts the lower end portion of the hose. Upon positioning the upper clamp half and lower clamp half at the desired location, the user may perform step 1130, which is fastening the first ends of the upper and lower clamp halves by transitioning the first cam lever clamp from the release position into a retaining position at the first ends of the upper and lower clamp halves. Similarly, the user may then fasten the second ends of the upper and lower clamp halves by transitioning the second cam lever clamp from the release position into the retaining position at the second ends of the upper and lower clamp halves (step 1135). Upon transitioning the second cam lever clamp 200 to the retaining position, the dual cam lever hose clamp 1000 is preferably clamped and locked at the hosed end to a desired tightness. Details on how to fasten the first and second ends of the upper and lower clamp halves via the first cam lever clamp and the second cam lever clamp are described in detail below in FIGS. 11A and 11B. Finally, the user may perform step 1140, which is fastening the first cam lever and the second cam lever together by securing a fastening device around the second cam lever and a notch located on the first cam lever when both the first cam lever and the second cam lever are in the retaining position. An example of such a fastening device may include, without limitation, a zip tie that can be tied around notch 701 to restrict movement of the first and second cam levers 700, 800.

Figures 11A, 11B:
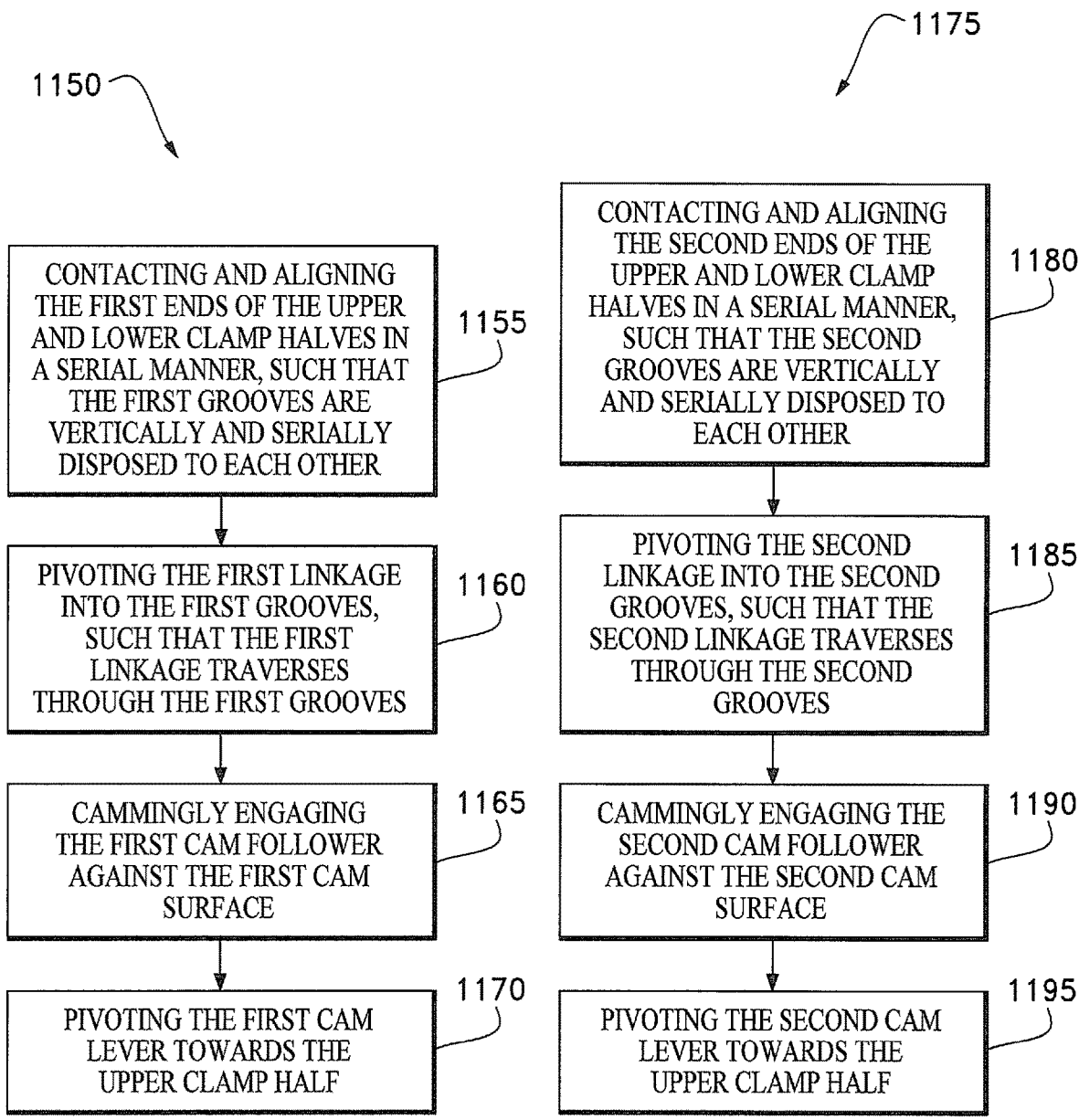
FIGS. 11A and 11B are flowcharts of embodiments of methods of transitioning first and second cam lever clamps from a release position into a retaining position.

FIGS. 11A and 11B are flowcharts of embodiments of methods of transitioning first and second cam lever clamps from a release position into a retaining position. Specifically, FIG. 11A is a flowchart of one embodiment of a method of transitioning the first cam lever clamp from the release position into the retaining position; and FIG. 11B is a flowchart of one embodiment of a method of transitioning the second cam lever clamp from the release position into the retaining position.

FIG. 11A shows a method of transitioning the first cam lever clamp from the release position into the retaining position, which may fasten the first ends of the upper and lower clamp halves. This may be accomplished by pulling the first cam follower 750 over the first end 300a of the upper clamp half 300 and clamping the first cam lever 700 over the upper clamp half 300, such that the first cam follower 750 may engage the first cam surface 350c and engage the first detent 350a. In particular, as shown in FIG. 11A, one embodiment of the method 1150 may comprise steps: 1155, 1160, 1165, and 1170. Here, the user may perform the first step 1155 of contacting and aligning the first ends of the upper and lower clamp halves in a serial manner. This may allow the first grooves to be vertically and serially disposed to each other. Once the first grooves are aligned, the user may pivot the first linkage into the first grooves, such that the first linkage may traverse through the first grooves (step 1160). Once the first linkage is received within the first grooves, the first cam follower may cammingly engage the first cam follower against the first cam surface (step 1165). When doing so, the user may pivot the first cam lever towards the upper clamp half (step 1170), resulting with the first cam follower transitioning from the second detent to the first detent of the first cam surface.

Similarly, FIG. 11B shows another method of transitioning the second cam lever clamp from the release position into the retaining position, which may fasten the second ends of the upper and lower clamp halves. This may be accomplished by pulling the second cam follower 850 over the second end 300b of the upper clamp half 300 and clamping the second cam lever 800 over the first cam lever 700, such that the second cam follower 850 can engage the second cam surface 325c and engage the first detent 325a. In particular, as shown in FIG. 11B, one embodiment of the method 1175 may comprise steps: 1180, 1185, 1190, and 1195. FIG. 11B shows the first step 1180 of contacting and aligning the second ends of the upper and lower clamp halves in a serial manner. This may allow the second grooves to be vertically and serially disposed to each other. Once the second grooves are aligned, the user may perform the next step 1185, which is pivoting the second linkage into the second grooves, such that the second linkage may traverse through the second grooves. The second cam follower may cammingly engage the second cam surface (1190), and when doing so, the user may pivot the second cam lever towards the upper clamp half (step 1195), resulting with the second cam follower transitioning from the second detent to the first detent of the second cam surface.

Figure 12:
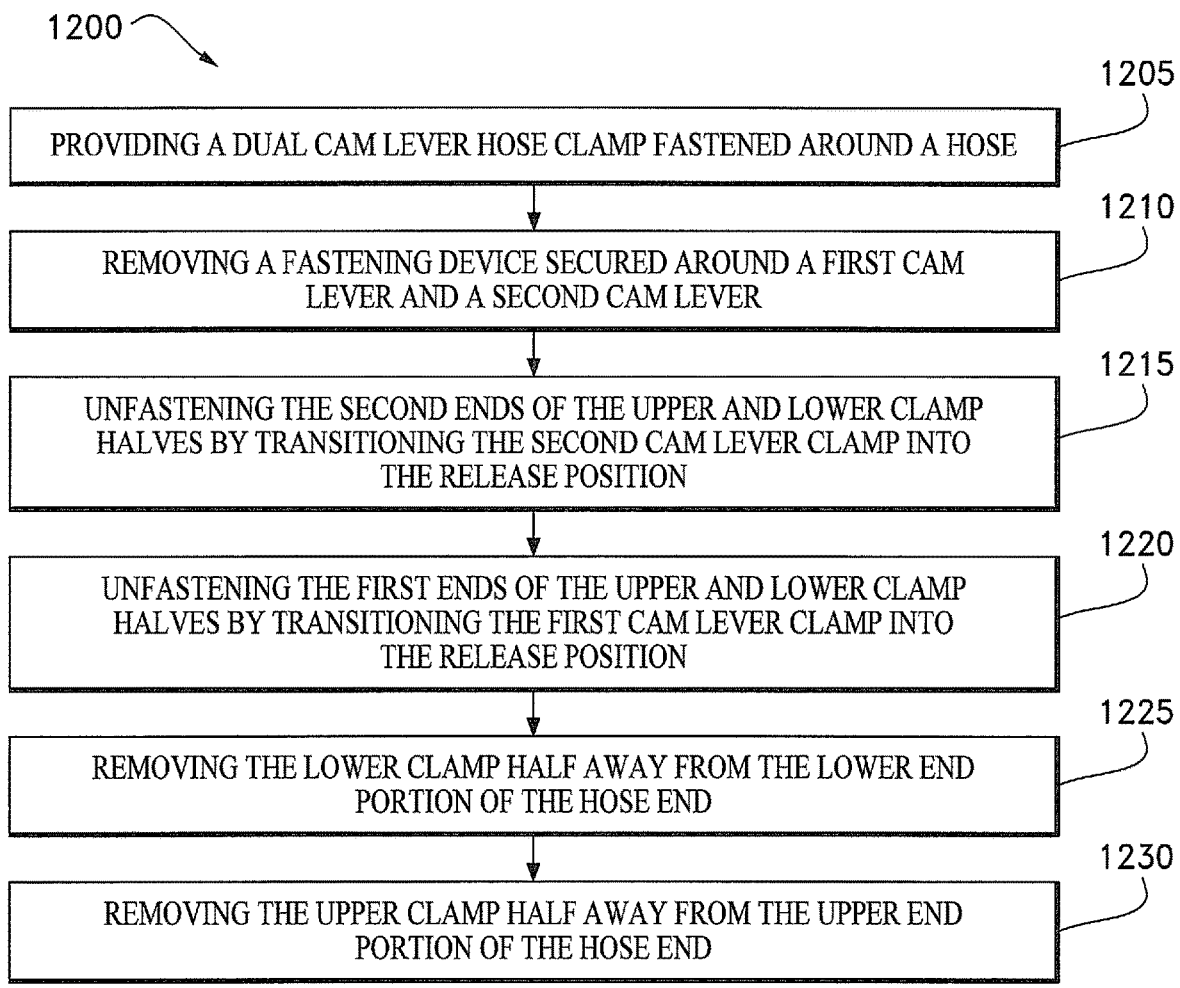
FIG. 12 is an illustration of one embodiment of a method of releasing a dual cam lever hose clamp from a hose.

FIG. 12 is an illustration of one embodiment of a method of releasing a dual cam lever hose clamp from a hose. Here, the method allows a user to remove the dual cam lever hose clamp 1000 from the hose end quickly. As shown in FIG. 12, one embodiment of the method 1200 may comprise steps: 1205, 1210, 1215, 1220, 1225, and 1230. FIG. 12 shows the first step 1205 of the method 1200, which may be providing a dual cam lever hose clamp fastened around a hose. Here the dual cam lever hose clamp 1000 may already be clamped around the hose after performing one or more embodiments of the method 1100, discussed above. In order to release the dual cam lever hose clamp 1000 from the hose, the user may first remove a fastening device secured around a first cam lever and a second cam lever (step 1210). As discussed above, a fastening device such as a zip tie may be fastened around notch 701 to restrict movement of the first and second cam levers 700, 800. The user may remove this fastening device in a number of ways such as cutting, tearing, or the like. After removing the fastening device at notch 701, the user may begin unfastening the second ends of the upper and lower clamp halves by transitioning the second cam lever clamp from the retaining position into the release position (step 1215). This can be performed by the method 1250 disclosed in FIG. 12A, which involves the user to actuate the first cam lever clamp 100 into its release position. Similarly, the user may then unfasten the first ends of the upper and lower clamp halves by transitioning the first cam lever clamp from the retaining position into the release position (step 1220), as shown in the method 1275 in FIG. 12B. This can be likewise be performed by the method 1275 disclosed in FIG. 12B, which involves the user to actuate the second cam lever clamp 200 into its release position. Once first and second ends of the upper and lower clamp halves are unfastened, the user may remove the lower clamp half away from the lower end portion of the hose end (step 1225) and remove the upper clamp half away from the upper end portion of the hose end (step 1230).

Figures 12A, 12B:
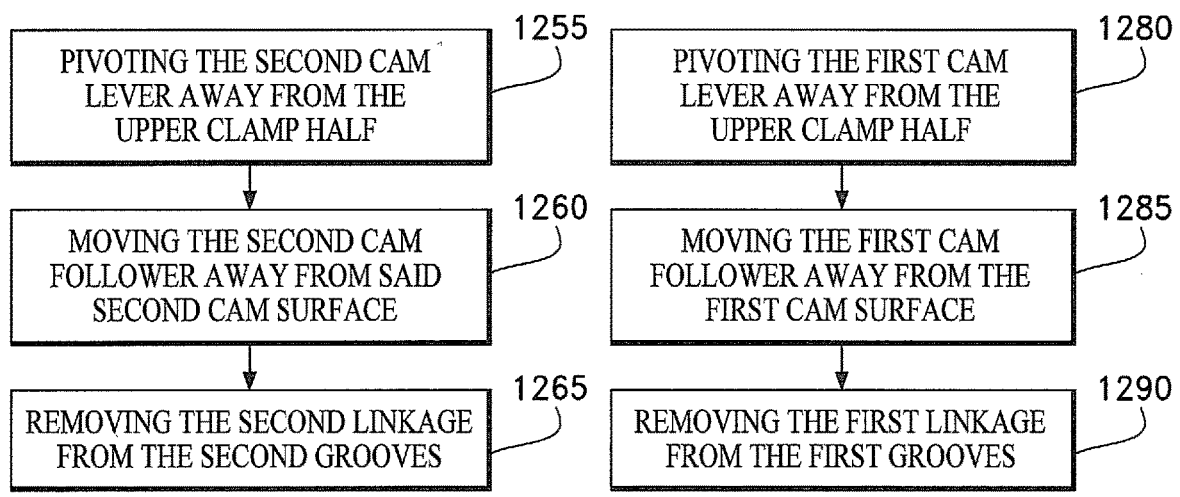
FIGS. 12A and 12B are flowcharts of embodiments of methods of transitioning second and first cam lever clamps from the retaining position into the release position.

FIGS. 12A and 12B are flowcharts of embodiments of methods of transitioning second and first cam lever clamps from the retaining position into the release position. Specifically, FIG. 12A is a flowchart of one embodiment of a method of transitioning the second cam lever clamp from the retaining position into the release position; and FIG. 12B is a flowchart of one embodiment of a method of transitioning the first cam lever clamp from the retaining position into the release position.

Regarding the method of transitioning the second cam lever clamp into the release position, this may be accomplished by grasping the second cam lever 800 and urging the second cam lever 800 from the retaining position to the release position, thereby releasing cam follower 850 from the first detent 325*a* to the second detent 325*b* of the second cam surface 325*c*. In this manner, the second cam lever clamp 200 can be pulled away from the second end 300*b* of the upper clamp half 300, thereby releasing the second end 300*b* of the upper clamp half 300 from the second end 400*b* of the lower clamp half 400. In particular, as shown in FIG. 12A, one embodiment of the method 1250 may comprise steps: 1255, 1260, and 1265. Here, the user may perform the first step 1255 of pivoting the second cam lever away from the upper clamp half. In doing so, the second cam follower may transition from the first detent to the second detent of the second cam surface, and as a result, the second step 1260 may be performed, which is moving the second cam follower away from said second cam surface. This will allow the user to then remove the second linkage from the second grooves (step 1265). Here, the second linkage 250 is then preferably pivoted about pivot 40 and away from the second end 300*b* of the upper clamp half 300. As a result, the first cam lever clamp is no longer restricted by the second cam lever clamp.

Regarding the first cam lever clamp, FIG. 12B depicts another similar method of transitioning the first cam lever clamp from the release position into the retaining position. After release of the second cam lever clamp 200, the user can grasp the first cam lever 700 and urge the first cam lever 700 from the retaining position to the release position, thereby releasing the first cam follower 750 from the first detent 350*a* to the second detent 350*b* of the first cam surface 350*c*. In this manner, the first cam lever clamp 100 can be pulled from the first end 300*a* of the upper clamp half 300, thereby releasing the first end 300*a* of the upper clamp half 300 from the first end 400*a* of the lower clamp half 400. In particular, as shown in FIG. 12B, one embodiment of the method 1275 may comprise steps: 1280, 1285, and 1290. Here, the user may perform the first step 1280 of pivoting the first cam lever away from the upper clamp half. When doing so, the first cam follower may transition from the first detent to the second detent of the first cam surface, and as a result, the second step 1285 may be performed, which is moving the first cam follower away from the first cam surface. The user may then remove the first linkage from the first grooves (step 1290). Here, the first linkage 150 is then preferably pivoted about pivot 60 and away from the first end 300*a* of the upper clamp half 300, thereby permitting the first clamp half 300 to be removed from the lower clamp half 400. Once first and second ends of the upper and lower clamp halves are unfastened, the user may remove the lower and upper clamp halves away from the hose end, as described in steps 1225 and 1230 above.

Figure 13:
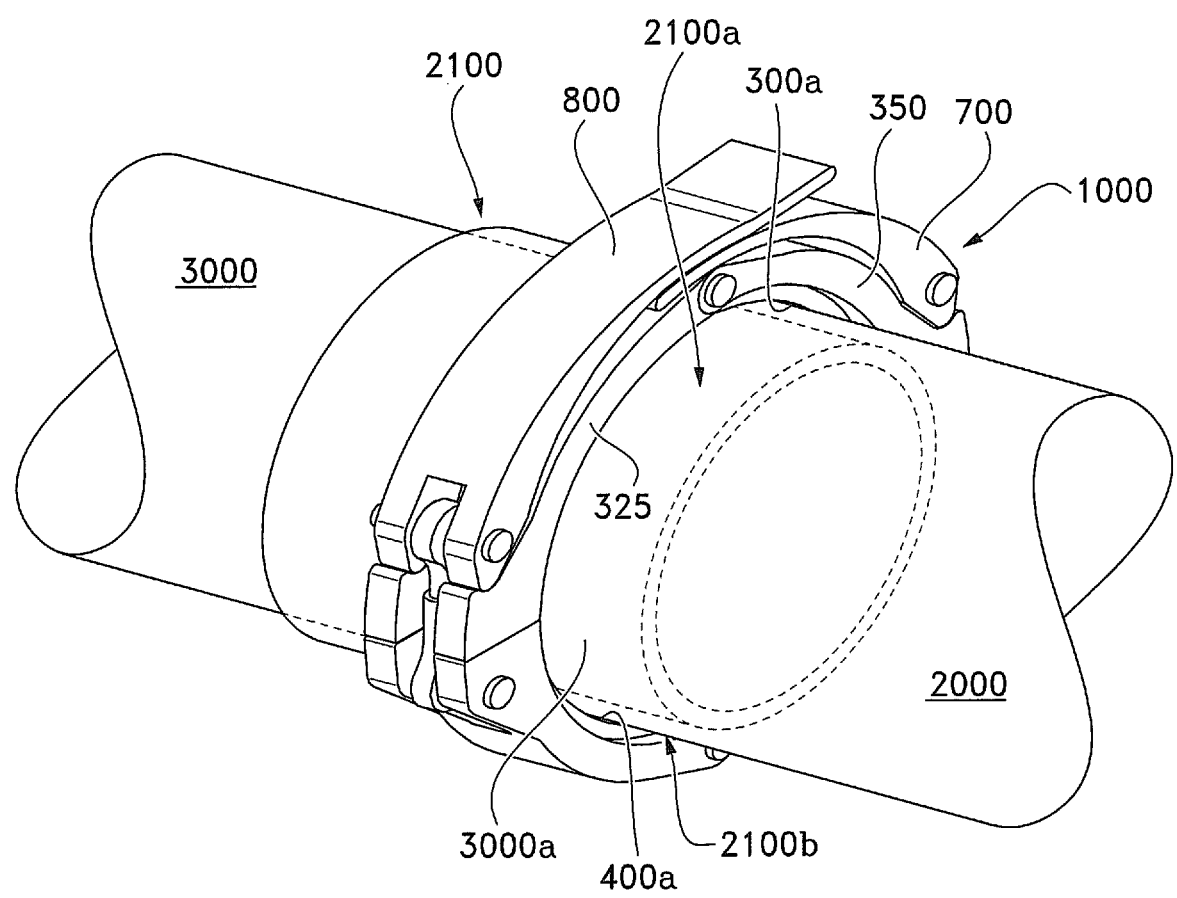
FIG. 13 is an illustration of one embodiment of a hose clamped to a pipe end via the dual cam lever hose clamp.

FIG. 13 is an illustration of one embodiment of a hose clamped to a pipe end via the dual cam lever hose clamp. As shown in FIG. 13, one embodiment of the hose 2000 may comprise a hose end 2100 having an upper end portion 2100*a* and a lower end portion 2100*b*. Importantly, both the upper end portion 2100*a* and a lower end portion 2100*b* may be substantially overlapping a pipe end 3000*a* of a pipe 3000, as shown in FIG. 13. The hose end 2100 may be clamped by the dual cam lever hose clamp 1000, wherein the upper clamp half 300, contacts the upper end portion 2100*a* of the hose end 2100, and the lower clamp half 400 contacts the lower end portion 2100*b* of the hose end 2100. Finally, FIG. 13 shows that the first cam lever clamp 100 and second cam lever clamp 200 are in the restraining positions.

The foregoing description of the embodiments of the dual cam lever hose clamp has been presented for the purposes of illustration and description. While multiple embodiments of the dual cam lever hose clamp are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the dual cam lever hose clamp and methods of use thereof are described in considerable detail, other versions are possible such as, for example, orienting and/or attaching the dual cam lever hose clamp in a different fashion. Therefore, the spirit and scope of the appended claims should not be limited to the description of versions included herein.

Except as stated immediately above, nothing, which has been stated or illustrated, is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A method of clamping a hose using a dual cam lever hose clamp, the method comprising the steps:
    (1) providing a dual cam lever hose clamp, comprising:
        first and second cam lever clamps, each configured to move between a retaining position and a release position; and
        upper and lower clamp halves adapted to form a collar when first ends of said upper and lower clamp halves fasten each other via said first cam lever clamp and when second ends of said upper and lower clamp halves fasten each other via said second cam lever clamp;
        wherein said first cam lever clamp comprises:
            a first linkage pivotally coupled to said first end of said lower clamp half and adapted to traverse through first grooves vertically and serially disposed on said first ends of said upper and lower clamp halves when said first cam lever clamp is in said retaining position, such that said first linkage is received within said first grooves of said upper and lower clamp halves; and
            a first cam lever pivotally coupled to said first linkage and adapted to fasten said first ends of said upper and lower clamp halves when a first cam follower cammingly engages a first cam surface of said upper clamp half, said first cam lever having an elongate and substantially curved shape extending beyond a center of said upper clamp half; and
        wherein said second cam lever clamp comprises:
            a second linkage pivotally coupled to said second end of said lower clamp half and adapted to traverse through second grooves vertically and serially disposed on said second ends of said upper and lower clamp halves when said second cam lever clamp is in said retaining position, such that said second linkage is received within said second grooves of said upper and lower clamp halves; and
            a second cam lever pivotally coupled to said second linkage and adapted to fasten said second ends of said upper and lower clamp halves when a second cam follower cammingly engages a second cam surface of said upper clamp half, said second cam lever having an elongate and substantially curved shape extending beyond said center of said upper clamp half, such that said second cam lever is configured to overlap and obstruct said first cam lever when said first and second cam lever clamps are in said retaining position;
    (2) positioning a hose end of a hose around a pipe end, such that an upper end portion and a lower end portion of said hose end substantially overlaps said pipe end;
    (3) positioning said upper clamp half on said upper end portion of said hose end, such that an inner surface of said upper clamp half contacts said upper end portion of said hose;
    (4) positioning said lower clamp half directly beneath said upper clamp half and said lower end portion of said hose, such that an inner surface of said lower clamp half contacts said lower end portion of said hose;
    (5) fastening said first ends of said upper and lower clamp halves by transitioning said first cam lever clamp from said release position into said retaining position at said first ends of said upper and lower clamp halves, said transitioning step of said first cam lever clamp comprising the sub-steps of:
        a. contacting and aligning said first ends of said upper and lower clamp halves in a serial manner, such that said first grooves are vertically and serially disposed to each other;
        b. pivoting said first linkage into said first grooves, such that said first linkage traverses through said first grooves;
        c. cammingly engaging said first cam follower against said first cam surface; and
        d. pivoting said first cam lever towards said upper clamp half; and
    (6) fastening said second ends of said upper and lower clamp halves by transitioning said second cam lever clamp from said release position into said retaining position at said second ends of said upper and lower clamp halves, said transitioning step of said second cam lever clamp, comprising the sub-steps of:
        a. contacting and aligning said second ends of said upper and lower clamp halves in a serial manner, such that said second grooves are vertically and serially disposed to each other;
        b. pivoting said second linkage into said second grooves, such that said second linkage traverses through said second grooves;
        c. cammingly engaging said second cam follower against said second cam surface; and
        d. pivoting said second cam lever towards said upper clamp half.

2. The method of clamping a hose, according to claim 1, further comprising the step of:
    fastening said first cam lever and said second cam lever together by securing a fastening device around said second cam lever and a notch located on said first cam lever when both said first cam lever and said second cam lever are in said retaining position.

3. The method of clamping a hose, according to claim 1, wherein said first cam surface is located on said first end of said upper clamp half and comprises a first detent and a second detent.

4. The method of clamping a hose, according to claim 3, wherein when said first cam lever pivots towards said upper clamp half, said first cam follower transitions from said second detent to said first detent of said first cam surface.

5. The method of clamping a hose, according to claim 1, wherein said second cam surface is located on said second end of said upper clamp half and comprises a first detent and a second detent.

6. The method of clamping a hose, according to claim 5, wherein when said second cam lever pivots towards said upper clamp half, said second cam follower transitions from said second detent to said first detent of said second cam surface.

7. The method of clamping a hose, according to claim 1, wherein said first and second linkages each comprise upper and lower linkage portions adapted to fasten to each other via a screw thread fastener, such that, when said screw thread fastener is tightened, said first and second linkages are adjustable in length.

8. A method of clamping a hose using a dual cam lever hose clamp, the method comprising the steps:
    (1) providing a dual cam lever hose clamp, comprising:
        first and second cam lever clamps, each configured to move between a retaining position and a release position; and upper and lower clamp halves, each comprising two arm portions pivotally coupled to each other via first and second pivots, respectively, and adapted to form a collar when first ends of said upper and lower clamp halves fasten each other via said first cam lever clamp and when second ends of said upper and lower clamp halves fasten each other via said second cam lever clamp;

wherein said first cam lever clamp comprises:
  a first linkage pivotally coupled to said first end of said lower clamp half and adapted to traverse through first grooves vertically and serially disposed on said first ends of said upper and lower clamp halves when said first cam lever clamp is in said retaining position, such that said first linkage is received within said first grooves of said upper and lower clamp halves; and
  a first cam lever pivotally coupled to said first linkage and adapted to fasten said first ends of said upper and lower clamp halves when a first cam follower cammingly engages a first cam surface of said upper clamp half, said first cam lever having an elongate and substantially curved shape extending beyond said first pivot; and wherein said second cam lever clamp comprises:
  a second linkage pivotally coupled to said second end of said lower clamp half and adapted to traverse through second grooves vertically and serially disposed on said second ends of said upper and lower clamp halves when said second cam lever clamp is in said retaining position, such that said second linkage is received within said second grooves of said upper and lower clamp halves; and
  a second cam lever pivotally coupled to said second linkage and adapted to fasten said second ends of said upper and lower clamp halves when a second cam follower cammingly engages a second cam surface of said upper clamp half, said second cam lever having an elongate and substantially curved shape extending beyond said first pivot, such that said second cam lever is configured to overlap and obstruct said first cam lever when said first and second cam lever clamps are in said retaining position;

(2) positioning a hose end of a hose around a pipe end, such that an upper end portion and a lower end portion of said hose end substantially overlaps said pipe end;

(3) positioning said upper clamp half on said upper end portion of said hose end, such that an inner surface of said upper clamp half contacts said upper end portion of said hose;

(4) positioning said lower clamp half directly beneath said upper clamp half and said lower end portion of said hose, such that an inner surface of said lower clamp half contacts said lower end portion of said hose;

(5) fastening said first ends of said upper and lower clamp halves by transitioning said first cam lever clamp from said release position into said retaining position at said first ends of said upper and lower clamp halves, said transitioning step of said first cam lever clamp comprising the sub-steps of:
  a. contacting and aligning said first ends of said upper and lower clamp halves in a serial manner, such that said first grooves are vertically and serially disposed to each other;
  b. pivoting said first linkage into said first grooves, such that said first linkage traverses through said first grooves;
  c. cammingly engaging said first cam follower against said first cam surface; and
  d. pivoting said first cam lever towards said upper clamp half; and (6) fastening said second ends of said upper and lower clamp halves by transitioning said second cam lever clamp from said release position into said retaining position at said second ends of said upper and lower clamp halves, said transitioning step of said second cam lever clamp, comprising the sub-steps of:
  a. contacting and aligning said second ends of said upper and lower clamp halves in a serial manner, such that said second grooves are vertically and serially disposed to each other;
  b. pivoting said second linkage into said second grooves, such that said second linkage traverses through said second grooves;
  c. cammingly engaging said second cam follower against said second cam surface; and
  d. pivoting said second cam lever towards said upper clamp half.

9. The method of clamping a hose, according to claim 8, further comprising the step of:
  fastening said first cam lever and said second cam lever together by securing a fastening device around said second cam lever and a notch located on said first cam lever when both said first cam lever and said second cam lever are in said retaining position.

10. The method of clamping a hose, according to claim 8, wherein said first cam surface is located on said first end of said upper clamp half and comprises a first detent and a second detent.

11. The method of clamping a hose, according to claim 10, wherein when said first cam lever pivots towards said upper clamp half, said first cam follower transitions from said second detent to said first detent of said first cam surface.

12. The method of clamping a hose, according to claim 8, wherein said second cam surface is located on said second end of said upper clamp half and comprises a first detent and a second detent.

13. The method of clamping a hose, according to claim 12, wherein when said second cam lever pivots towards said upper clamp half, said second cam follower transitions from said second detent to said first detent of said second cam surface.

14. The method of clamping a hose, according to claim 8, wherein said first and second linkages each comprise upper and lower linkage portions adapted to fasten to each other via a screw thread fastener, such that, when said screw thread fastener is tightened, said first and second linkages are adjustable in length.

15. A method of releasing a dual cam lever hose clamp from a hose, the method comprising the steps:
  (1) providing a dual cam lever hose clamp fastened around a hose, said dual cam lever hose clamp comprising:
    first and second cam lever clamps, each configured to move between a retaining position and a release position; and
    upper and lower clamp halves, each comprising two arm portions pivotally coupled to each other via first and second pivots, respectively, and adapted to form a collar when first ends of said upper and lower clamp halves fasten each other via said first cam lever clamp and when second ends of said upper and lower clamp halves fasten each other via said second cam lever clamp;

wherein said first cam lever clamp comprises:
    a first linkage pivotally coupled to said first end of said lower clamp half and adapted to traverse through first grooves vertically and serially disposed on said first ends of said upper and lower clamp halves when said first cam lever clamp is in said retaining position, such that said first linkage is received within said first grooves of said upper and lower clamp halves; and
    a first cam lever pivotally coupled to said first linkage and adapted to fasten said first ends of said upper and lower clamp halves when a first cam follower cammingly engages a first cam surface of said upper clamp half, said first cam lever having an elongate and substantially curved shape extending beyond said first pivot;

wherein said second cam lever clamp comprises:
    a second linkage pivotally coupled to said second end of said lower clamp half and adapted to traverse through second grooves vertically and serially disposed on said second ends of said upper and lower clamp halves when said second cam lever clamp is in said retaining position, such that said second linkage is received within said second grooves of said upper and lower clamp halves; and
    a second cam lever pivotally coupled to said second linkage and adapted to fasten said second ends of said upper and lower clamp halves when a second cam follower cammingly engages a second cam surface of said upper clamp half, said second cam lever having an elongate and substantially curved shape extending beyond said first pivot, such that said second cam lever is configured to overlap and obstruct said first cam lever when said first and second cam lever clamps are in said retaining position;

wherein said first and second linkages each comprise upper and lower linkage portions adapted to fasten to each other via a screw thread fastener, such that, when said screw thread fastener is tightened, said first and second linkages are adjustable in length; and wherein, when said first and second cam levers transition into said retaining position, said first and second cam levers fasten and tighten said collar;

(2) unfastening said second ends of said upper and lower clamp halves by transitioning said second cam lever clamp from said retaining position into said release position, said transitioning step of said second cam lever clamp, comprising the sub-steps of:
    a. pivoting said second cam lever away from said upper clamp half;
    b. moving said second cam follower away from said second cam surface; and
    c. removing said second linkage from said second grooves;

(3) unfastening said first ends of said upper and lower clamp halves by transitioning said first cam lever clamp from said retaining position into said release position, said transitioning step of said first cam lever clamp, comprising the sub-steps of:
    a. pivoting said first cam lever away from said upper clamp half;
    b. moving said first cam follower away from said first cam surface; and
    c. removing said first linkage from said first grooves;

(4) removing said lower clamp half away from said lower end portion of said hose end; and (5) removing said upper clamp half away from said upper end portion of said hose end.

16. The method of releasing a dual cam lever hose clamp, according to claim 15, further comprising the step of:
removing a fastening device secured around said first cam lever and said second cam lever.

17. The method of releasing a dual cam lever hose clamp, according to claim 15, wherein said second cam surface is located on said second end of said upper clamp half and comprises a first detent and a second detent.

18. The method of releasing a dual cam lever hose clamp, according to claim 17, wherein when said second cam lever pivots away from said upper clamp half, said second cam follower transitions from said first detent to said second detent of said second cam surface.

19. The method of releasing a dual cam lever hose clamp, according to claim 15, wherein said first cam surface is located on said first end of said upper clamp half and comprises a first detent and a second detent.

20. The method of releasing a dual cam lever hose clamp, according to claim 19, wherein when said first cam lever pivots away from said upper clamp half, said first cam follower transitions from said first detent to said second detent of said first cam surface.

\* \* \* \* \*